(12) United States Patent
Ito et al.

(10) Patent No.: US 8,073,823 B2
(45) Date of Patent: Dec. 6, 2011

(54) DATABASE MANAGEMENT PROGRAM

(75) Inventors: Daisuke Ito, Kokubunji (JP); Masaaki Tanizaki, Nishitokyo (JP); Kohji Kimura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 531 days.

(21) Appl. No.: 11/922,936

(22) PCT Filed: Sep. 14, 2005

(86) PCT No.: PCT/JP2005/016965
§ 371 (c)(1),
(2), (4) Date: Jan. 25, 2008

(87) PCT Pub. No.: WO2007/032068
PCT Pub. Date: Mar. 22, 2007

(65) Prior Publication Data
US 2008/0281791 A1 Nov. 13, 2008

(51) Int. Cl.
*G06F 7/00* (2006.01)
*G06F 17/00* (2006.01)
(52) U.S. Cl. .................................................... 707/693
(58) Field of Classification Search .................. 707/693
See application file for complete search history.

(56) References Cited

U.S. PATENT DOCUMENTS

| | | | |
|---|---|---|---|
| 6,397,311 B1 * | 5/2002 | Capps | 711/165 |
| 2004/0006574 A1 * | 1/2004 | Witkowski et al. | 707/104.1 |
| 2008/0059412 A1 * | 3/2008 | Tarin | 707/2 |
| 2008/0059492 A1 * | 3/2008 | Tarin | 707/100 |

FOREIGN PATENT DOCUMENTS

| | | |
|---|---|---|
| JP | 03-092942 | 9/1989 |
| JP | 07-152615 | 11/1993 |
| JP | 08-069403 | 8/1994 |
| JP | 11-110265 | 10/1997 |

OTHER PUBLICATIONS

Bach, The Design of the Unix Operating System, 1986, Prentice Hall, Inc., 1st ed, 1st ed, pp. 60-88, 272-276.*
Rusling, The Linux Kernel, Apr. 1997, http://www.science.unitn.it/, Version 0.1-10(30), http://www.science.unitn.it/~fiorella/guidelinux/tlk/tlk-html.html.*
International Search Report for PCT/JP2005/016965 mailed Oct. 25, 2005.
"Scalable Database Server", HiRDB Version 7 System Introduction and Design Guide (for UNIX®) pp. 342-343 in Japanese and 5 pages of English translation.

* cited by examiner

*Primary Examiner* — Pierre Vital
*Assistant Examiner* — Jason Liao
(74) *Attorney, Agent, or Firm* — Stites & Harbison PLLC; Juan Carlos A. Marquez, Esq.

(57) ABSTRACT

A database management method for updating data of a duplicated ID sequential arrangement table and arranging segments of data with respect to the arrangement table includes managing a management table holding the arrangement table name and a name of a duplicated key column, arranging a new row in an empty space in a first partial set of segments of rows having identical values in the duplicated key column to that of the new row, searching for a sequential empty space having capacity larger than that needed to hold the first partial set of segments of rows, and moving the first partial set of segments of rows to the sequential empty space and arranging the new row in a different set of segments if the sequential empty space is found or arranging the new row in a new segment if the sequential empty space is not found.

1 Claim, 28 Drawing Sheets

FIG. 2

DUPLICATED ID SEQUENTIAL ARRANGEMENT TABLE IDENTIFICATION TABLE — 1005

| MANAGEMENT NUMBER | ... | TABLE NAME |
|---|---|---|
| 1 | ... | INTERSECTION TABLE |
| ⋮ | ⋮ | ⋮ |
| ⋮ | ⋮ | ⋮ |

DUPLICATED ID SEQUENTIAL ARRANGEMENT TABLE ID MANAGEMENT TABLE — 1006

| TABLE NAME | ... | COLUMN NAME |
|---|---|---|
| INTERSECTION TABLE | ... | ID |
| ⋮ | ⋮ | ⋮ |
| ⋮ | ⋮ | ⋮ |

DATABASE MANAGEMENT PROGRAM

TECHNICAL FIELD

The present invention relates to database management systems (DBMSs) in which the data space is segmentalized, and, more particularly, to database management programs of DBMSs implemented for embedded devices.

BACKGROUND ART

With regard to embedded devices having large-capacity storage, list fetch is a function that is used frequently in many applications in which such devices are employed, such as car navigation systems, music players, and HDD recorders.

Especially in the case of car navigation systems, a dedicated file system is typically used in which emphasis is placed on real-time processing performance of list fetch operations that use an I/O device that performs seek processing extremely slowly (for example, an I/O device that performs seek processing on CD/DVD storage format) and are implemented so that data to be list-displayed is positioned in sequential space on the disk. However, such a dedicated file system is designed for a device that performs no update operation, and in a case where update is performed using a device capable of update operation (for example, an HDD), the data is rearranged at each update operation.

Further, in a DBMS, as a function to allocate data in sequential space, there is a clustered table that guarantees that data is sorted physically with respect to a specified clustered key column of the table. For example, this shown in Non-Patent Document 1, which is cited herein below.

Here, an example of a conventional embodiment of the clustered table in a DBMS in which storage space management is composed of pages and segments is shown in FIG. 4 and is explained hereinafter.

Here, a page (5002) is a physical unit representing a minimum unit of data I/O to a storage space (5001), and each of segments (5003, 5004) is a physical unit representing a minimum unit for allocation of space in a table and an index. Each segment is composed of a plurality of the pages. The relation between the clustered table and the storage space is shown in FIG. 5. The clustered table (6001) is a clustered table in which a sequential number column (6002) is set as a clustered key column and segments on storage space (6007) are allocated. Rows (6003, 6004, 6005) of the clustered table (6001) are stored in a segment (6014) on the storage space (6007), and another segment (6015) is also allocated to the clustered key column. Thus, in a case where the sequential number column is set as the clustered key column, data is sorted physically with respect to the sequential number column. In segments (6014, 6015), empty space (6012, 6013) is secured for future insert operations.

When an insert operation to the clustered table is performed, since the table is required to maintain a state in which data is sorted physically, insertion is performed by a method different from that for a normal table. A method of performing an insert operation to the clustered table is explained with reference to a flow chart shown in FIG. 6. In the insert processing (7001) for performing the insert operation, first, the size of a row to be inserted and the size of empty spaces of the storage space are compared to make a judgment (7002) of whether the insertion can be performed. Here, if the insertion cannot be performed, an error judgment is made (7012), and the insert processing ends (7009). If the insertion can be performed, a segment including a largest row among rows having a clustered key that is equal or smaller to that of the largest row is searched for in the storage space (7003), and a judgment (7004) of whether there is empty space to insert the row for insertion in the segment is made. If such empty space exists, a procedure A (7013) is carried out. In procedure A, first, a lock of an index related to a corresponding table is obtained (7005), and then, the row is inserted into the empty space in the segment (7006), the index is updated (7007), the lock of the index is released (7008), and the insert processing ends (7009). An operation example in a case where a row having a clustered key of 12 is inserted according to procedure A (7013) is shown in FIG. 7. Here, since there is still empty space (8005) in the segment (8002) that includes a row (8004) having the same clustered key, the row (8006) having the clustered key of 12 is inserted into the empty space in the same segment.

On the other hand, if there is no empty space identified in the judgment (7004) of whether there is empty space to insert the row in the same segment, a procedure B (7014) is carried out. In procedure B, first, a lock of the index related to the corresponding table is obtained (7010), and then, the row is inserted into a new segment (7011), the lock of the index is released (7007), and the insert processing ends (7009). An operation example for a case where a row having a clustered key of 12 is inserted according to procedure B (8014) is shown in FIG. 8. Here, since there is no empty space in the segment (9002) that includes a row (9004) having the same clustered key, a new segment (9005) is secured and the row (9006) having the clustered key of 12 is inserted is the new segment.

Since storage I/O is sequentialized, the search speed improves through use of the clustered table in performing a search with a designated range of the clustered key value. However, a state in which data is sorted physically is broken by update and insert operations over space that was empty when the table was prepared, and therefore, periodic maintenance is required. This maintenance involves rearrangement of all data in the same manner as in the update operation for the dedicated file system described above.

In a DBMS used for an embedded application, to achieve data I/O performance comparable to that of a dedicated file system that performs no update operations, it is necessary to arrange data in physical sequential space in the same manner as the conventional system described above. However, in the embedded application, since long-term, maintenance-free performance and stability is important, the conventional clustered table cannot be used. Therefore, a table structure that is specialized for data fetch of a pattern called using list fetch in such an embedded application and improving I/O performance is desired.

Characteristics of the list fetch operation will now be explained with reference to FIG. 9 using a car navigation application as an example. In the car navigation system, intersection data is handled in units of map information. The intersection data is divided into sections (10001) each having a unique identifier and individually managed. In the car navigation application, real-time processing performance of list fetch operations of the intersection data is of primary importance. Such a list fetch is performed in a route search in the present example in the following two patterns:

1. List fetch of intersections in a section (10002) that includes the car in which the a car navigation application is being used; and 2. list fetch of intersections in the section (10002) that includes the car in which the a car navigation application is being used and the 8 adjacent sections (10003).

Here, a pattern in which all data is arranged in sequential space in a case of a file system dedicated for car navigation is used as the pattern of 1, and in which it is impossible to arrange all data including the pattern 2 in the sequential space. Therefore, also in a DBMS specialized for an embedded application, it is sufficient to guarantee that the pattern 1 is arranged in the sequential space.

Also, as a characteristic common to the two patterns, it is noted that a search condition uses an equality condition of a section number and that a plurality of intersections having the same section number exist in search target data. By formulating this characteristic in terms of a DBMS, it becomes a search of an equality condition with respect to columns that include a duplicated key.

It is further noted that similar list fetch operations also appear frequently in applications other than the car navigation application discussed above. For example, list fetch operations such as "list of music titles by an identical artist" and "list of music titles contained in an identical album" in music player applications, as well as "list of programs of a specified month and day" and "list of programs of a specified channel" in HDD recorder applications, frequently appear.

Non-Patent Document 1: [Product Manual] Scalable Database Server HiRDB Version 7 System Introduction and Design Guide (For UNIX®) 3000-6-272, 12.9 Specification of Clustered Key", pp. 342-343.

DISCLOSURE OF THE INVENTION

In cases of managing a single set or a plurality of sets of rows having duplicate values in a column A using relational database, even if a row having a value of column A that is duplicated is arranged in sequential space at an initial state to speed-up a search specifying a condition of column A, the time required for the search specifying the condition of column A is lengthened in conventional methods. This is because, by repeating insert, deletion, and update operations of the rows, a state in which the row having the value of column A that is duplicated is arranged in the sequential space is broken, and a time-consuming rearrangement of all rows is required.

Accordingly, an object of exemplary embodiments of the present invention is to provide a database management program in which the time required for a search specifying a condition of column A is not lengthened and a time-consuming rearrangement of all rows is not required, even if insert, deletion, and update operations of the rows are repeated and, moreover, even in a case where a row having a duplicated value of column A is arranged in the sequential space at an initial state to speed up the search specifying the condition of column A.

In a database management program according to embodiments of the present invention, when no empty sequential space is found in a space where the rows having a duplicate value in column A are arranged on storage when performing insertion, deletion, and update operations, only a set of rows having the duplicate value in column A are arranged in the sequential space using an algorithm having a characteristic of including a procedure to search for a sequential empty space that has larger capacity than that used for all the rows having the duplicate value of column A, and a procedure to move all the rows having the duplicate value of column A to the empty space in a case where such an empty space is found by the search.

According to embodiments of the present invention, when managing a single set or a plurality of sets of rows having duplicate values in column A using a relational database, in a case where a row having a duplicate value of column A is arranged in a sequential space at an initial state to speed up the search having the condition of column A, even if insertion, deletion, and update operations of a plurality of rows are repeated, the time required for the search specifying the condition of column A is not lengthened, and a time-consuming rearrangement of all rows is not required.

BRIEF DESCRIPTIONS OF THE DRAWINGS

FIG. 2 is a data configuration diagram showing a duplicated ID sequential arrangement table identification table according to the first embodiment of the present invention;

FIG. 3 is a configuration diagram showing a duplicated ID sequential arrangement table ID management table according to the first embodiment of the present invention;

Figure 25:
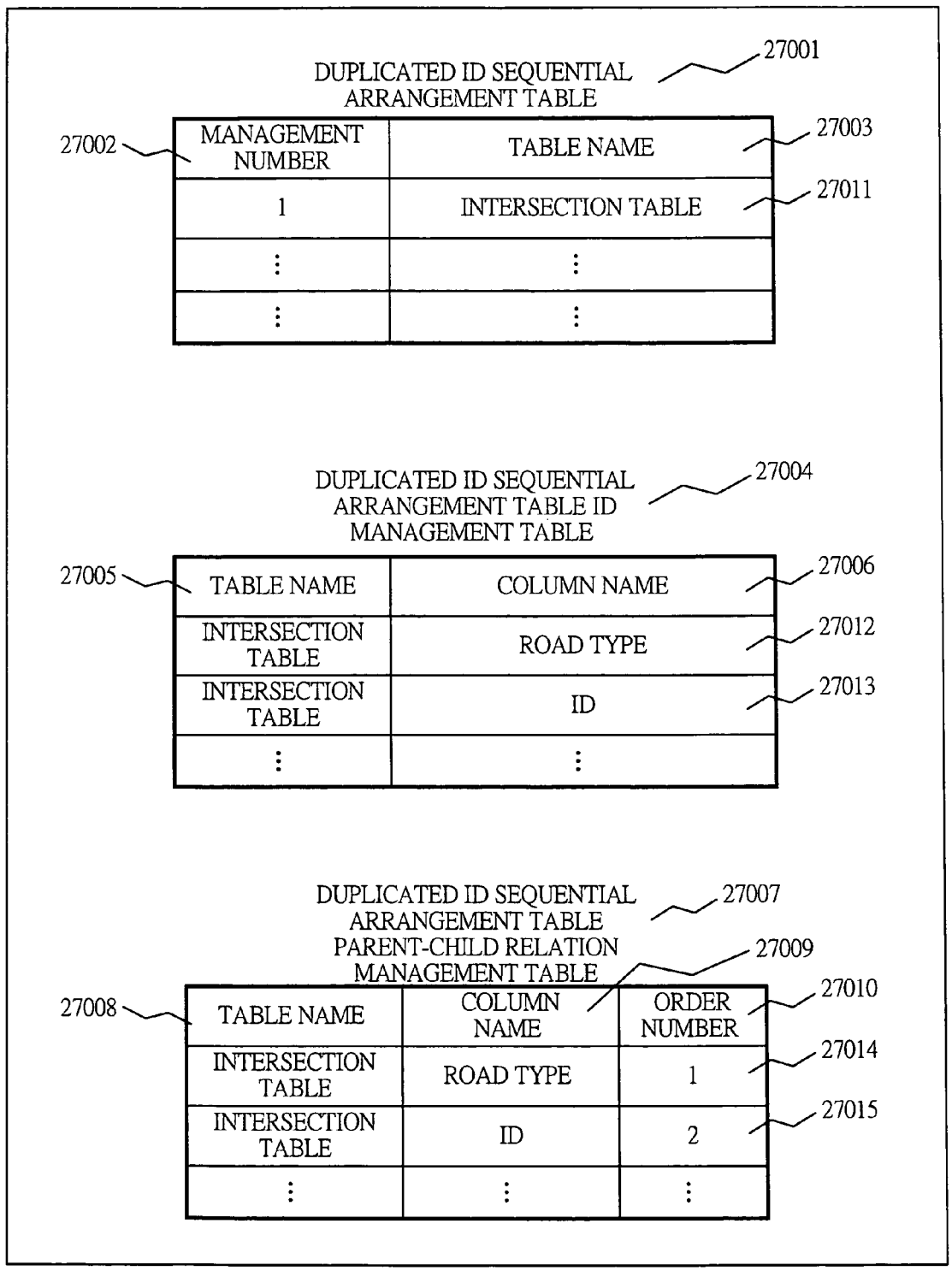
Figure 26:
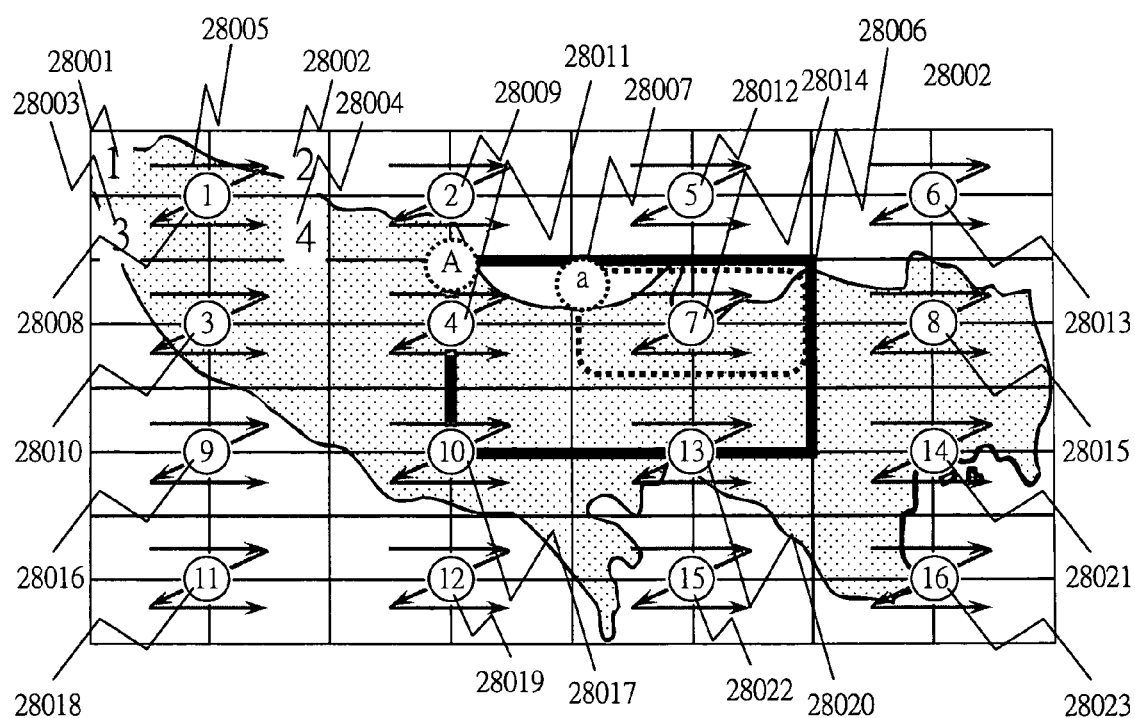
Figure 27:
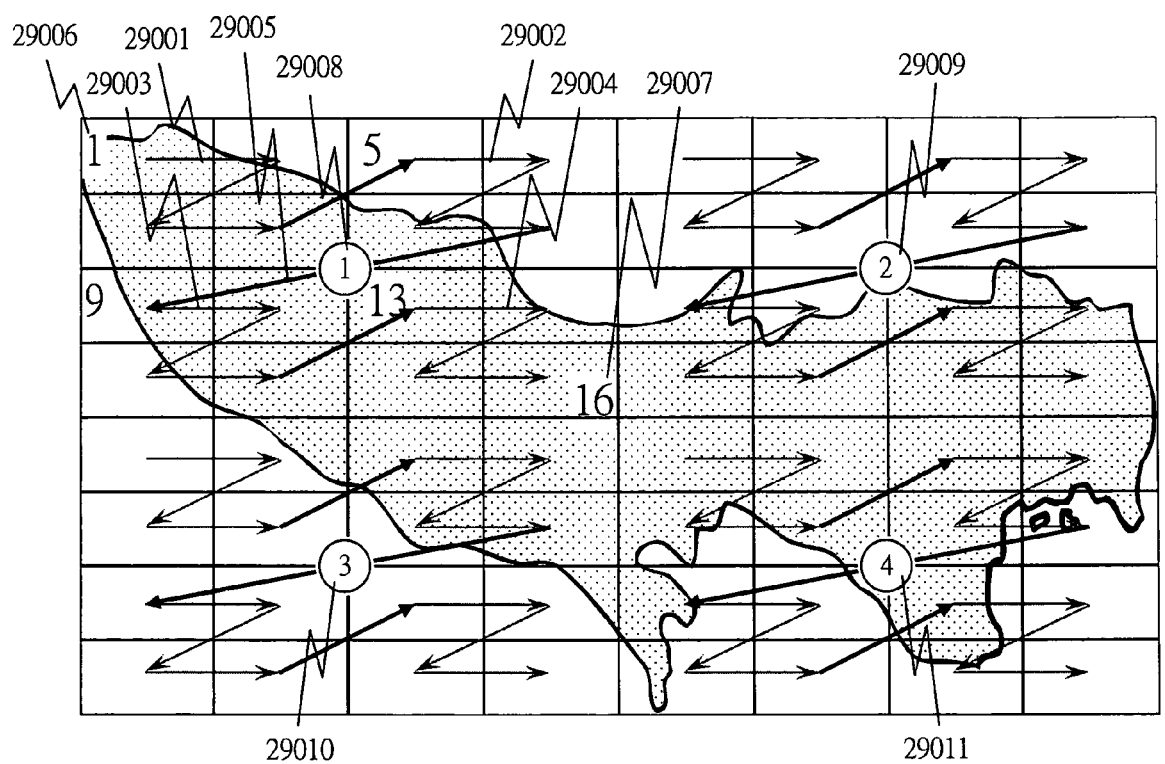
Figure 28:
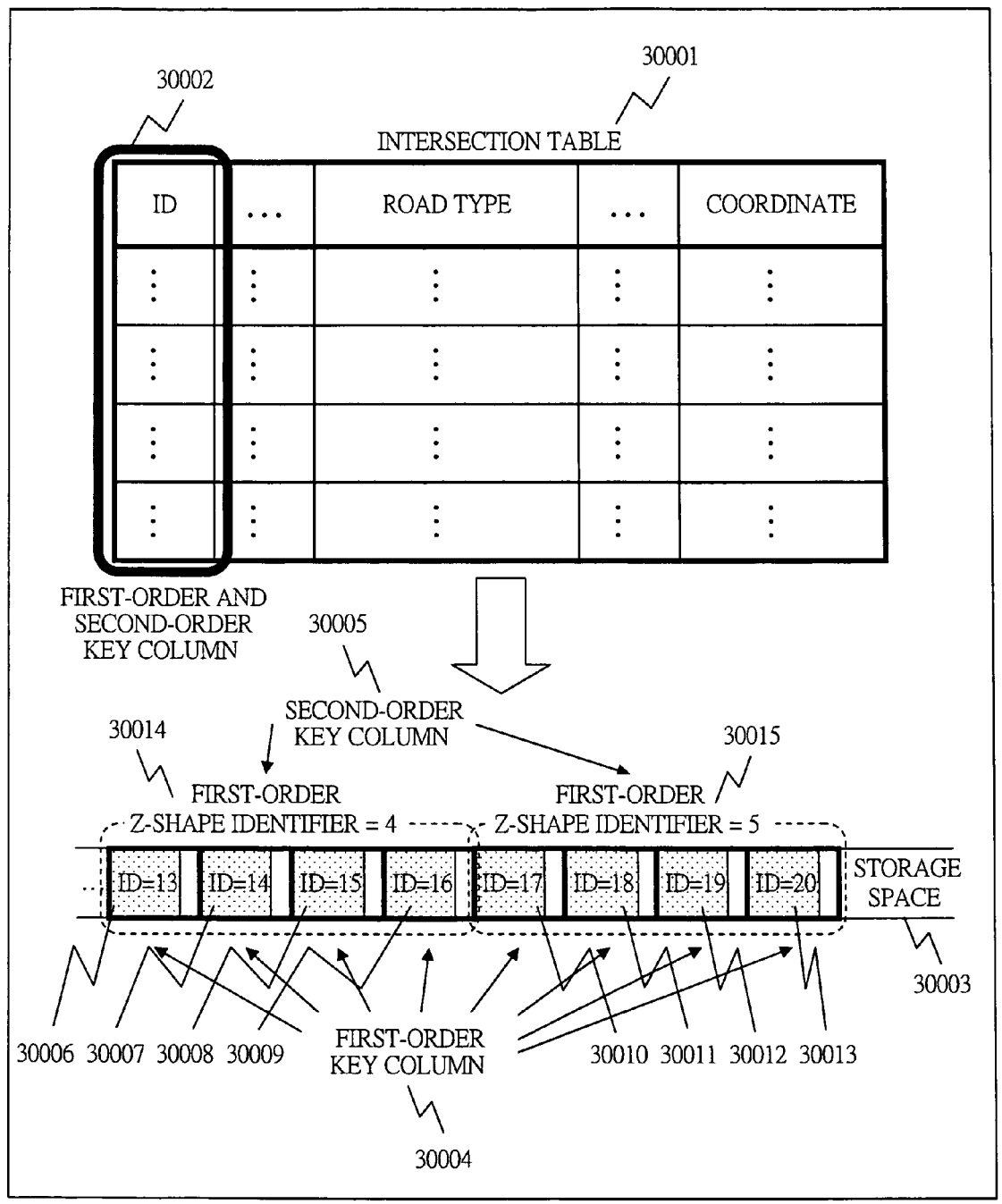
Figure 29:
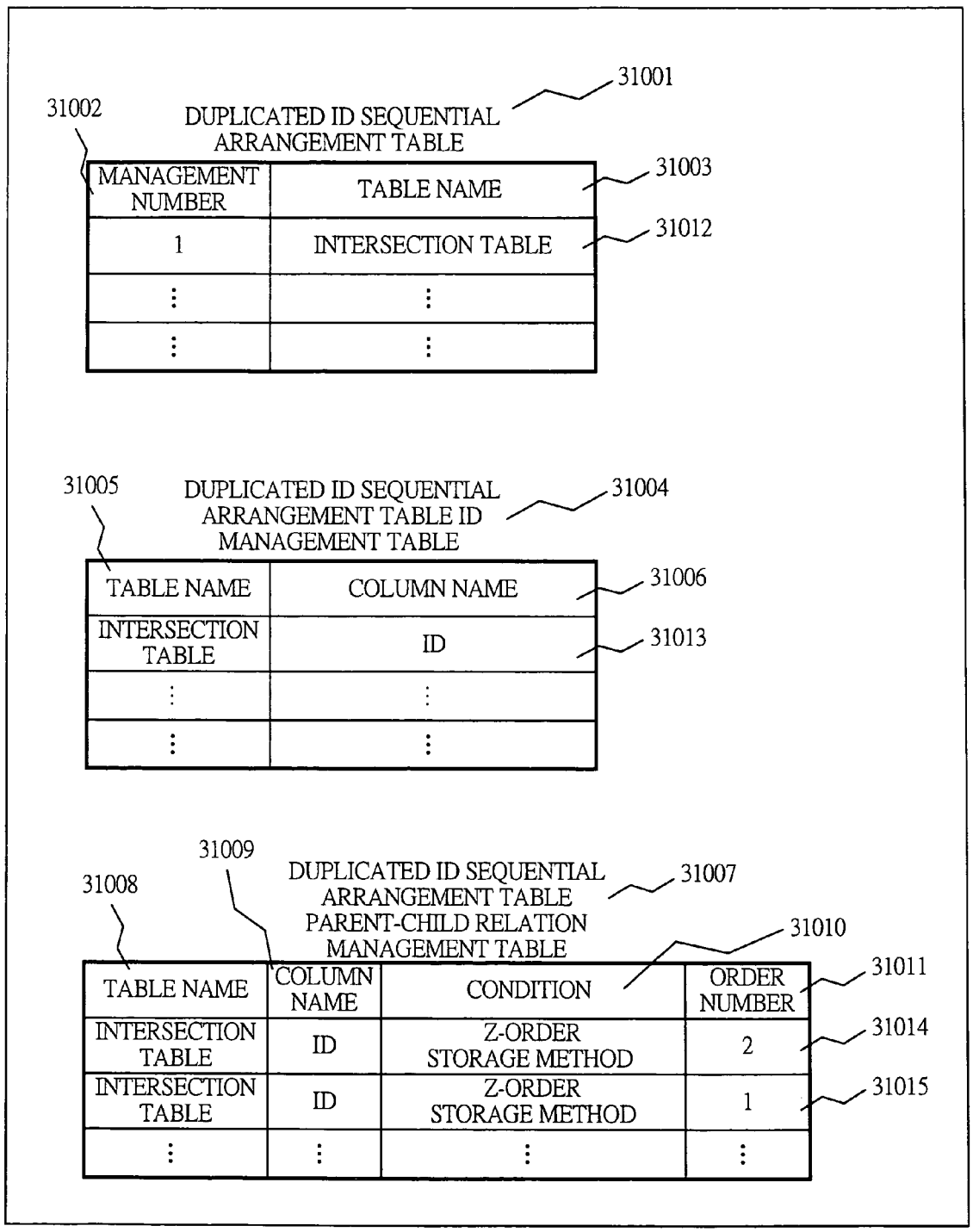

FIG. 25 is an explanatory diagram showing a method of structuring a duplicated ID sequential arrangement table identification table, a duplicated ID sequential arrangement table ID management table and a duplicated ID sequential arrangement table parent-child relation management table suitable for operation of the duplicated ID sequential arrangement table according to the second embodiment of the present invention;

FIG. 26 is a diagram showing an example of a Z-order storage method according to a third embodiment of the present invention;

FIG. 27 is a diagram showing an example of the Z-order storage method according to the third embodiment of the present invention;

FIG. 28 is an explanatory diagram showing an example of a structure of a table including a duplicated key based on the Z-order storage method according to the third embodiment of the present invention and a structure thereof on storage space; and FIG. 29 is an explanatory diagram showing a method of structuring a duplicated ID sequential arrangement table identification table, a duplicated ID sequential arrangement table ID management table and a duplicated ID sequential arrangement table parent-child relation management table suitable for operation of a duplicated ID sequential arrangement table according to the third embodiment of the present invention.

BEST MODE FOR CARRYING OUT THE INVENTION

First Embodiment

A first embodiment of the present invention is described with reference to FIGS. 1 to 3 and FIGS. 10 to 18.

Figure 1:
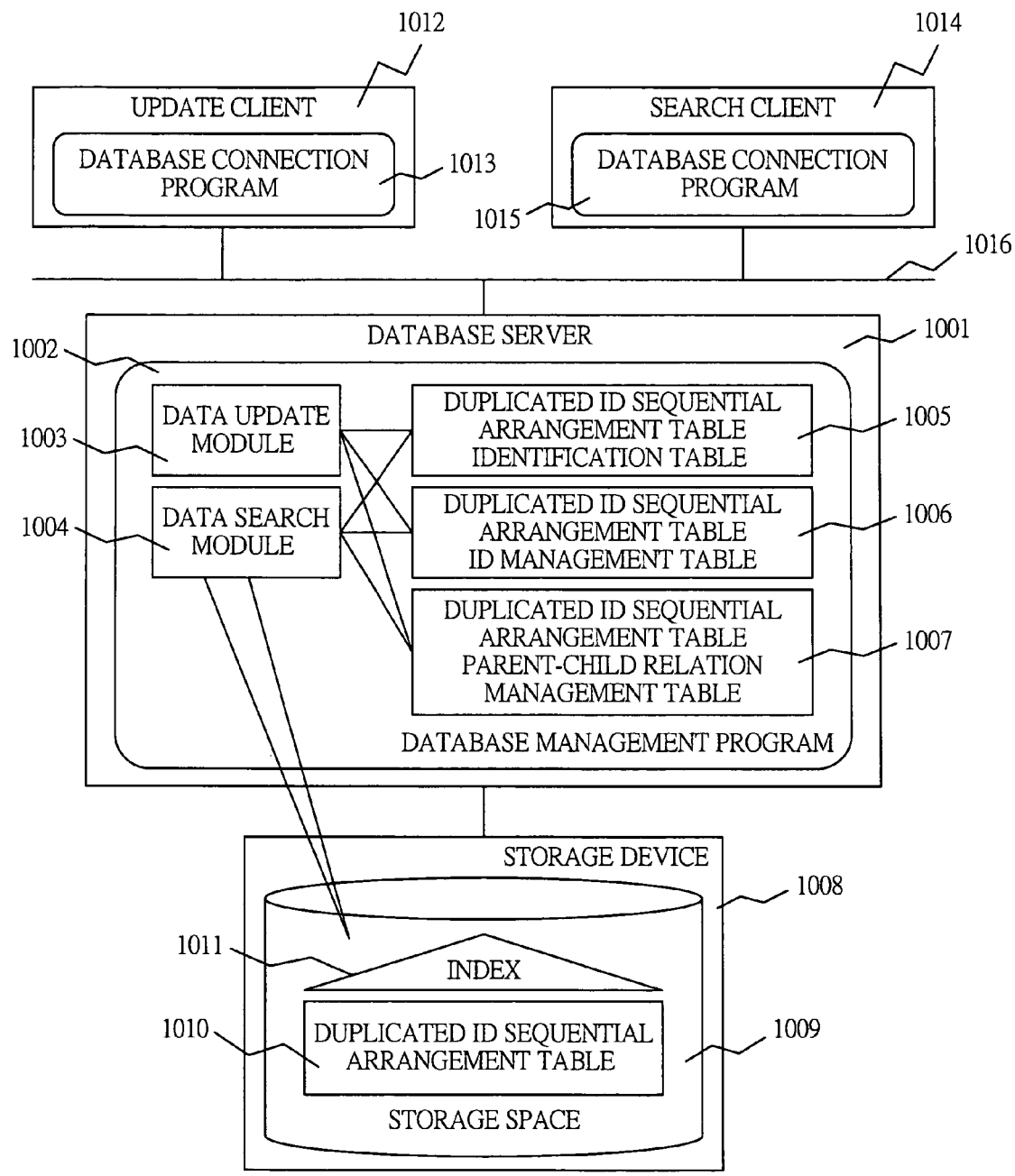
FIG. 1 is a block diagram showing a structure of a database management system according to a first embodiment of the present invention.
Figure 4:
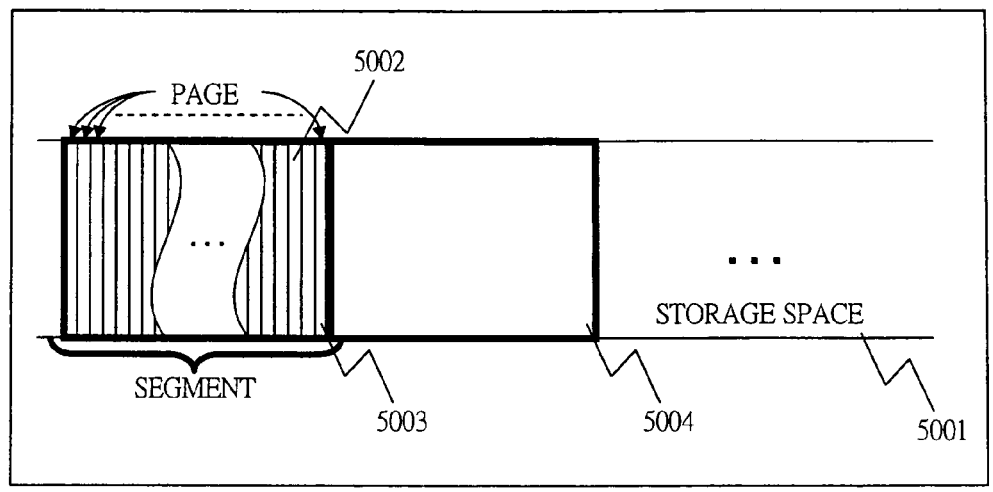
FIG. 4 is an explanatory diagram showing a storage space management method composed of a page and a segment in an embodiment of a clustered table of a conventional system.
Figure 5:
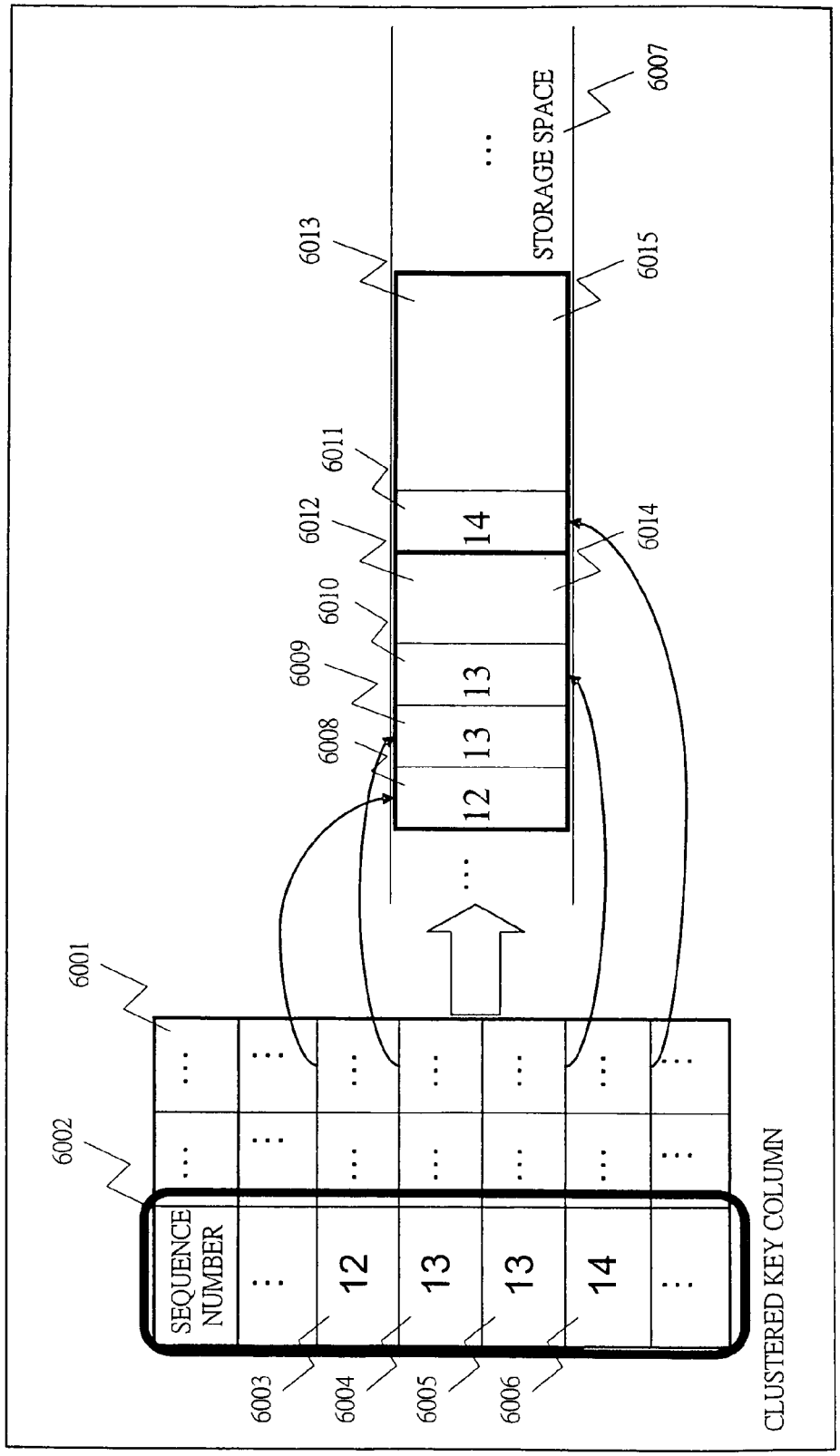
FIG. 5 is an explanatory diagram showing relation between the clustered table and storage space in the embodiment of the clustered table of the conventional system.
Figure 6:
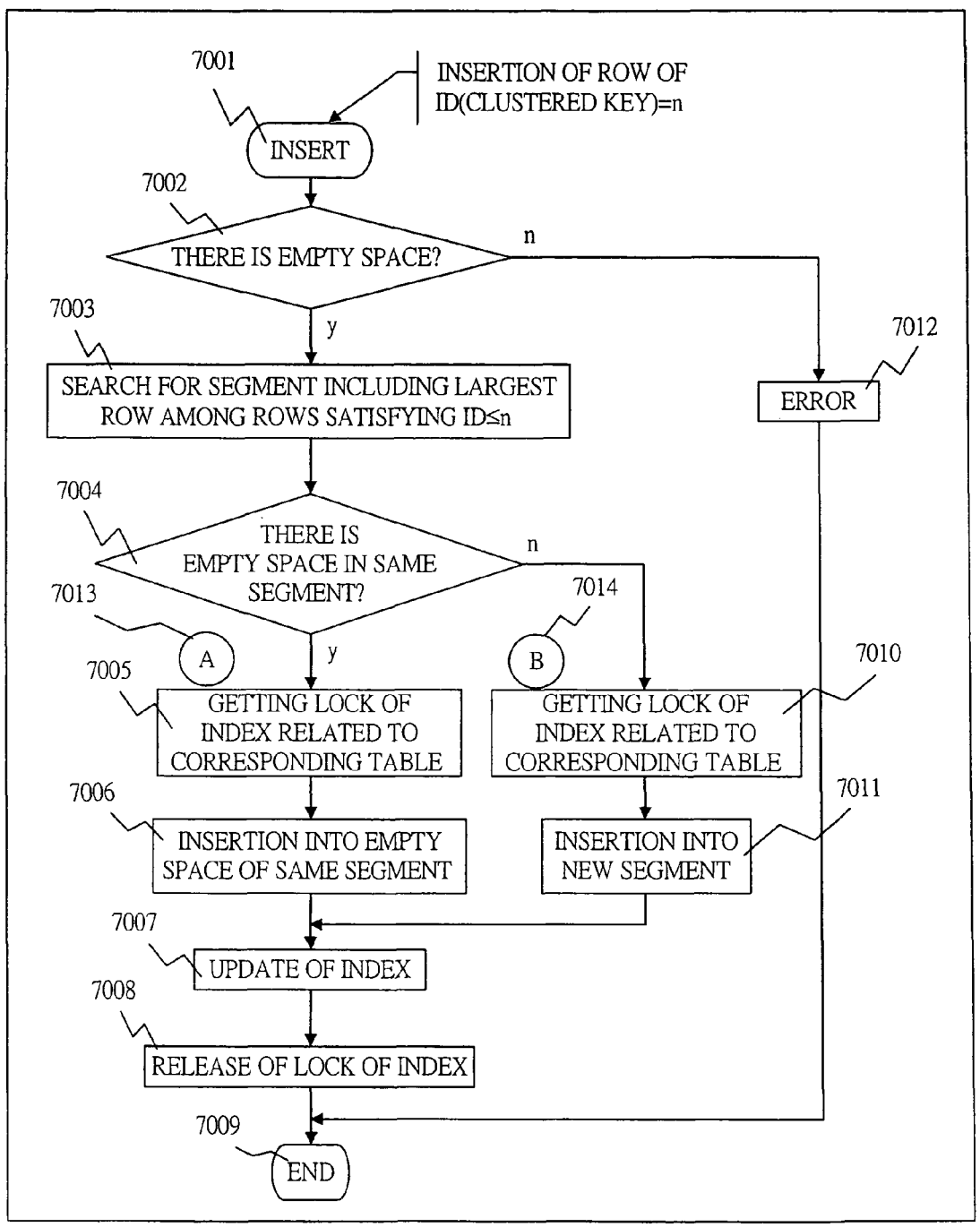
FIG. 6 is an explanatory diagram showing a flow chart of insert operation to the clustered table in the embodiment of the clustered table of the conventional system.
Figure 7:
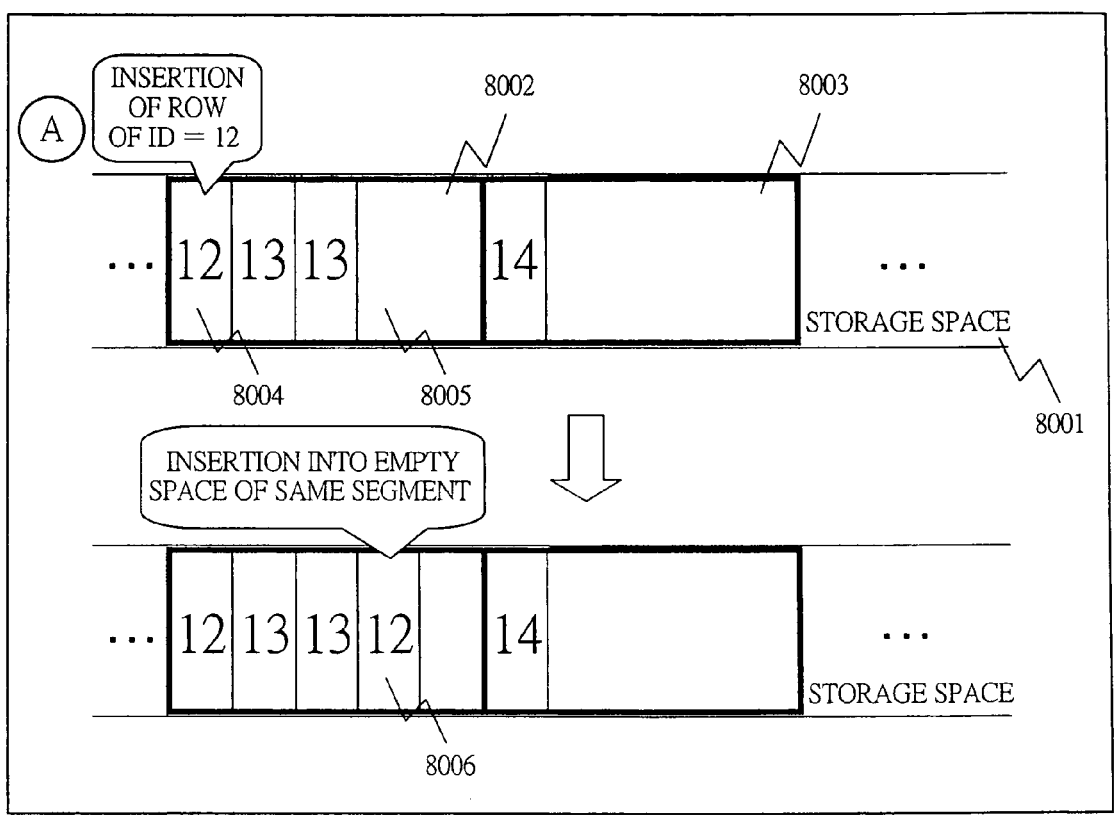
FIG. 7 is an explanatory diagram showing an example of a procedure A in the flow chart of the insert operation to the clustered table in the embodiment of the clustered table of the conventional system.
Figure 8:
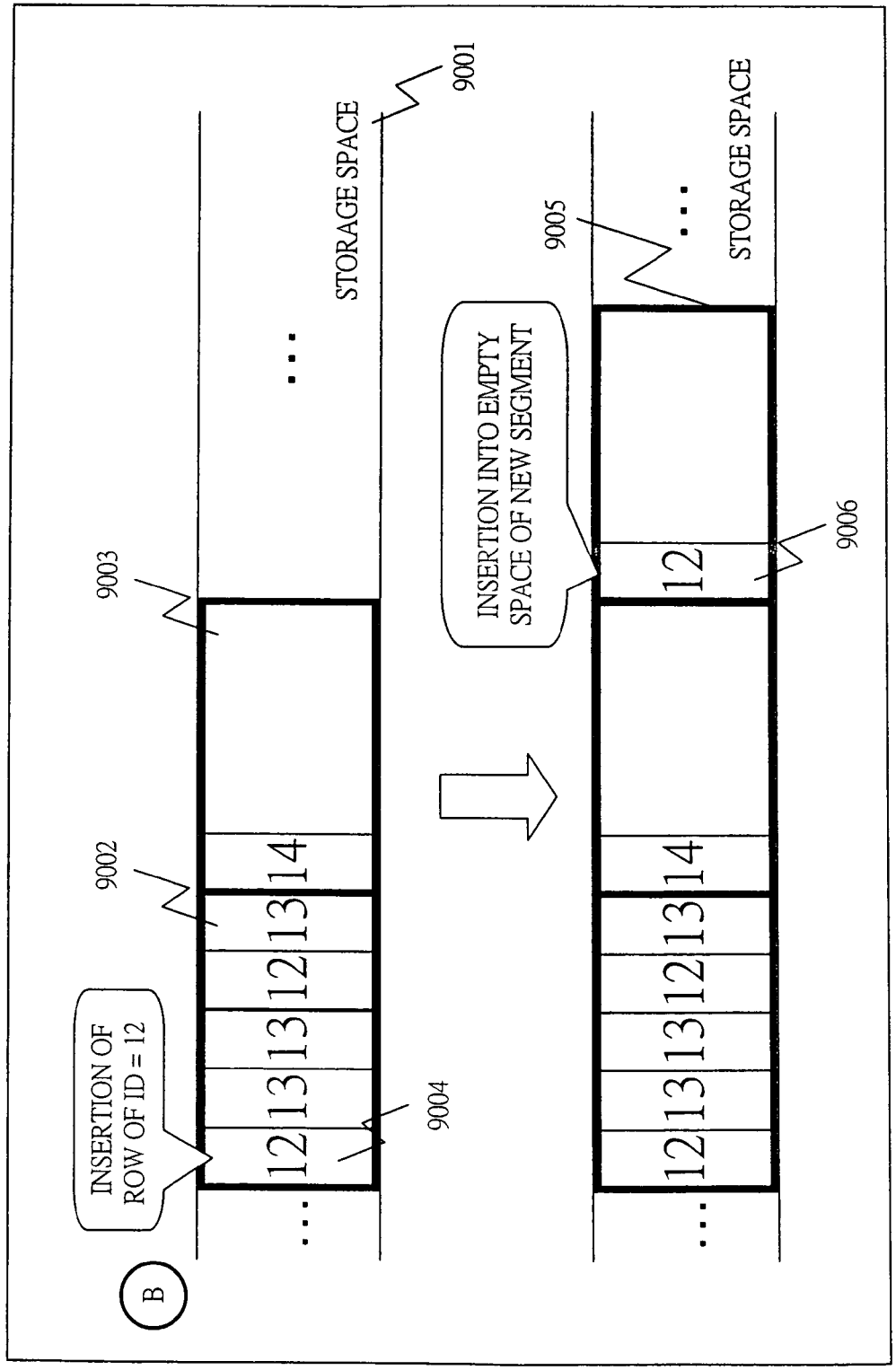
FIG. 8 is an explanatory diagram showing an example of a procedure B in the flow chart of the insert operation to the clustered table in the embodiment of the clustered table of the conventional system.

FIG. 1 shows an overall structure of a database management system according to the first embodiment of the present invention. Here, a database server (1001) and an update client (1012) and a search client (1014) are connected via a network (1016).

The database server (1001) executes a database management program (1002) and includes a storage device (1008).

The database management program (1002) includes a data update module (1003) and a data search module (1004), and further includes a duplicated ID sequential arrangement table identification table (1005), a duplicated ID sequential arrangement table ID management table (1006) and a duplicated ID sequential arrangement table parent-child relation management table (1007).

The storage device (1008) stores storage space (1009), and in the storage space (1009), a duplicated ID sequential arrangement table (1010) and an index (1011) are stored.

The data update module (1003) and the data search module (1004) refer to the duplicated ID sequential arrangement table identification table (1005), the duplicated ID sequential arrangement table ID management table (1006) and the duplicated ID sequential arrangement table parent-child relation management table (1007), and identify the duplicated ID sequential arrangement table (1010) and the index (1011).

It is noted that such an overall system structure is the same in a second embodiment and a third embodiment described herein below. The duplicated ID sequential arrangement table parent-child relation management table (1007) mainly used in the second embodiment and the third embodiment. In the explanation of the first embodiment described hereinafter, the duplicated ID sequential arrangement table parent-child relation management table (1007) does not appear.

A structure of the duplicated ID sequential arrangement table identification table is shown in FIG. 2. The duplicated ID sequential arrangement table identification table (1005) is a table in which a table that is an object of arrangement and management is registered so that data having duplicate IDs are arranged sequentially, and is structured to include a management number column (2002) and a table name column (2003). In an example shown in FIG. 2, a table named an intersection table is registered as the object of the arrangement and management with a management number 1.

Next, a structure of the duplicated ID sequential arrangement table ID management table is shown in FIG. 3. The duplicated ID sequential arrangement table ID management table 1006 has a table name column (3002) and a column name column (3003). A column name to be a standard of sequential arrangement is registered in correspondence with a table name which is the object of the arrangement and management.

Figure 9:
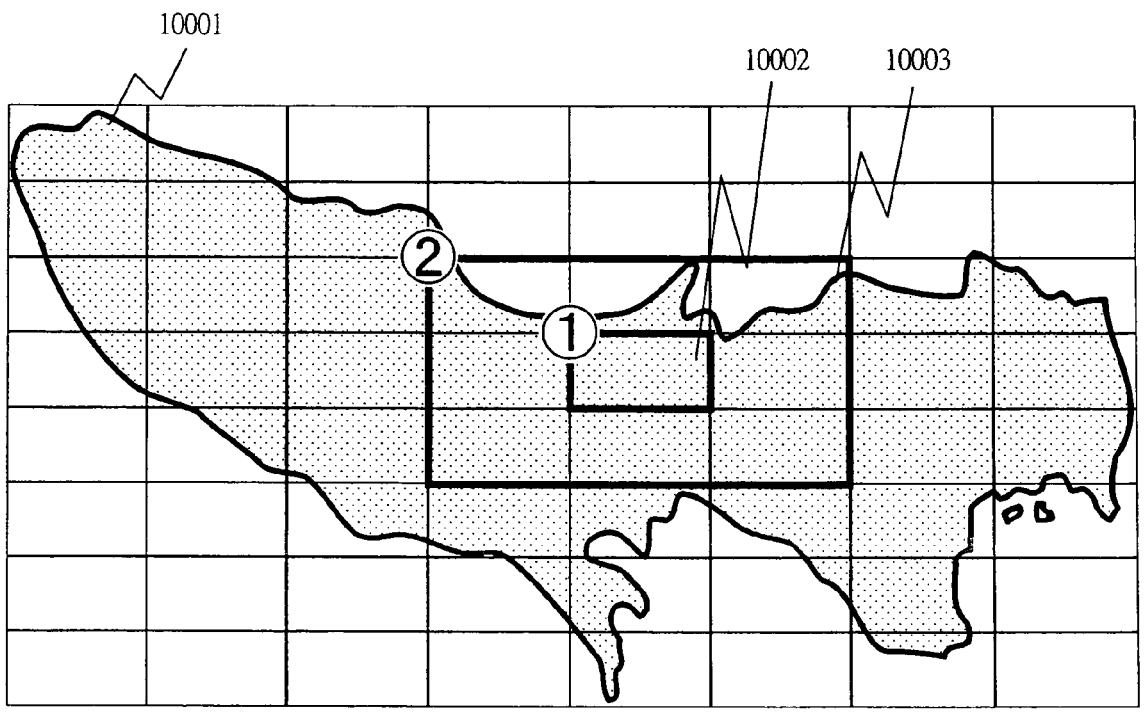
FIG. 9 is an explanatory diagram showing a characteristic of list fetch of the conventional system taking car navigation application as an example.
Figure 10:
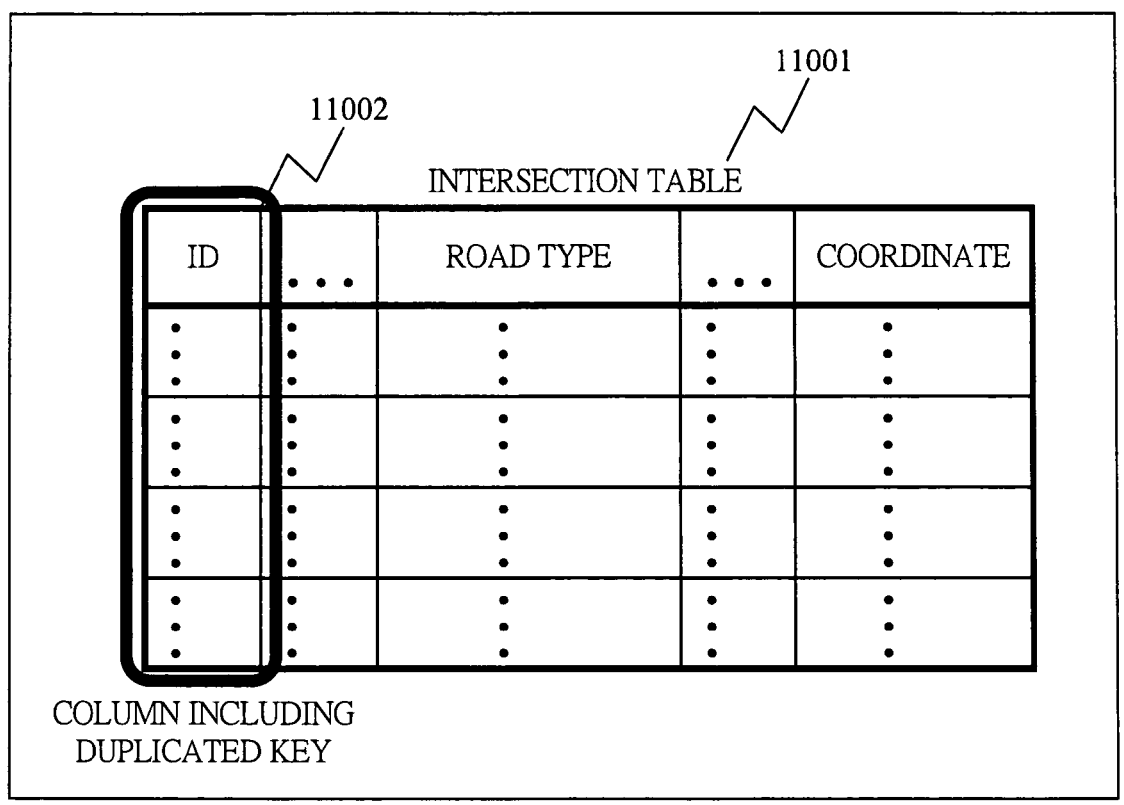
FIG. 10 is an explanatory diagram showing an example of a structure of a table including a duplicated key according to the first embodiment of the present invention.

FIG. 10 shows an actual example implementation of the intersection table described above. The intersection table (11001) is a table storing the intersection data divided into sections from in FIG. 9. Here, a column (11002) named ID corresponds to a section identifier. According to a registration content of the duplicated ID sequential arrangement table ID management table (1006) mentioned above, by setting an ID column value to a key, data of the intersection table (11001) is arranged and managed. In particular, storing to the duplicated ID sequential arrangement table (1010) is performed so that data of rows having duplicate values in the ID column is arranged in a sequential position.

Figure 11:
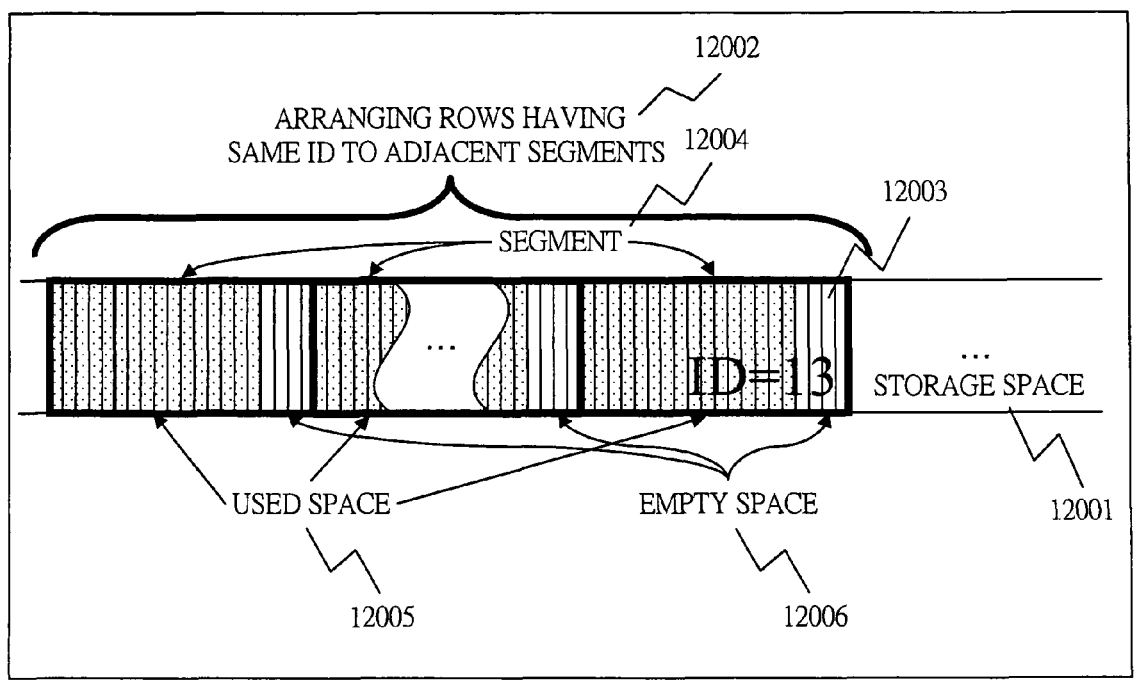
FIG. 11 is an explanatory diagram showing a structure of a duplicated ID sequential arrangement table on storage space according to the first embodiment of the present invention.

A part of a structure of the duplicated ID sequential arrangement table (1010) on the storage space is shown in FIG. 11. The duplicated ID sequential arrangement table is a table having a characteristic that a set of rows (12002) having the same ID on the storage space (1009) is arranged (12005) in adjacent segments (12004). Further, in the same manner as the case of the clustered table, empty space (12006) is secured for preparation for future insert operations.

Figure 12:
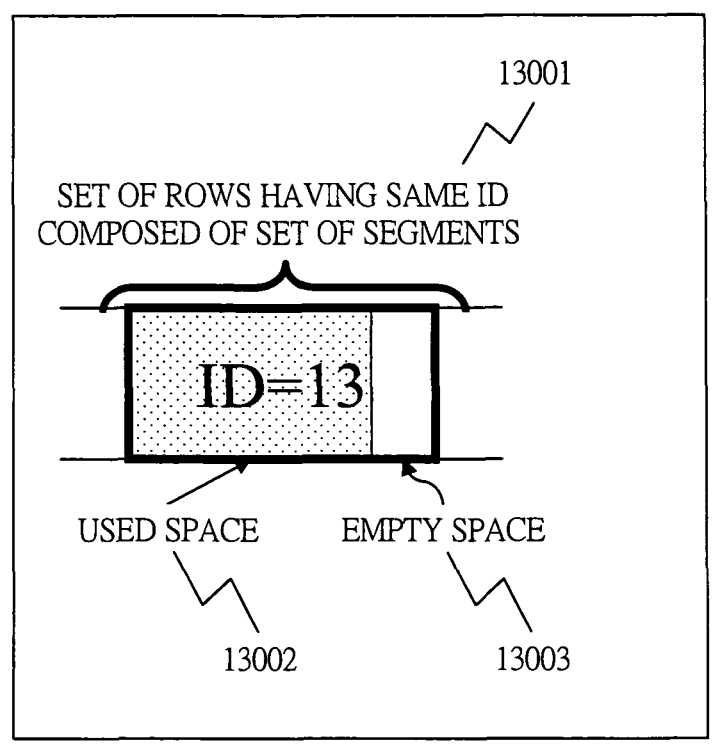
FIG. 12 is an explanatory diagram showing an example of a schematic view of the structure of the duplicated ID sequential arrangement table on the storage space according to the first embodiment of the present invention.
Figure 13:
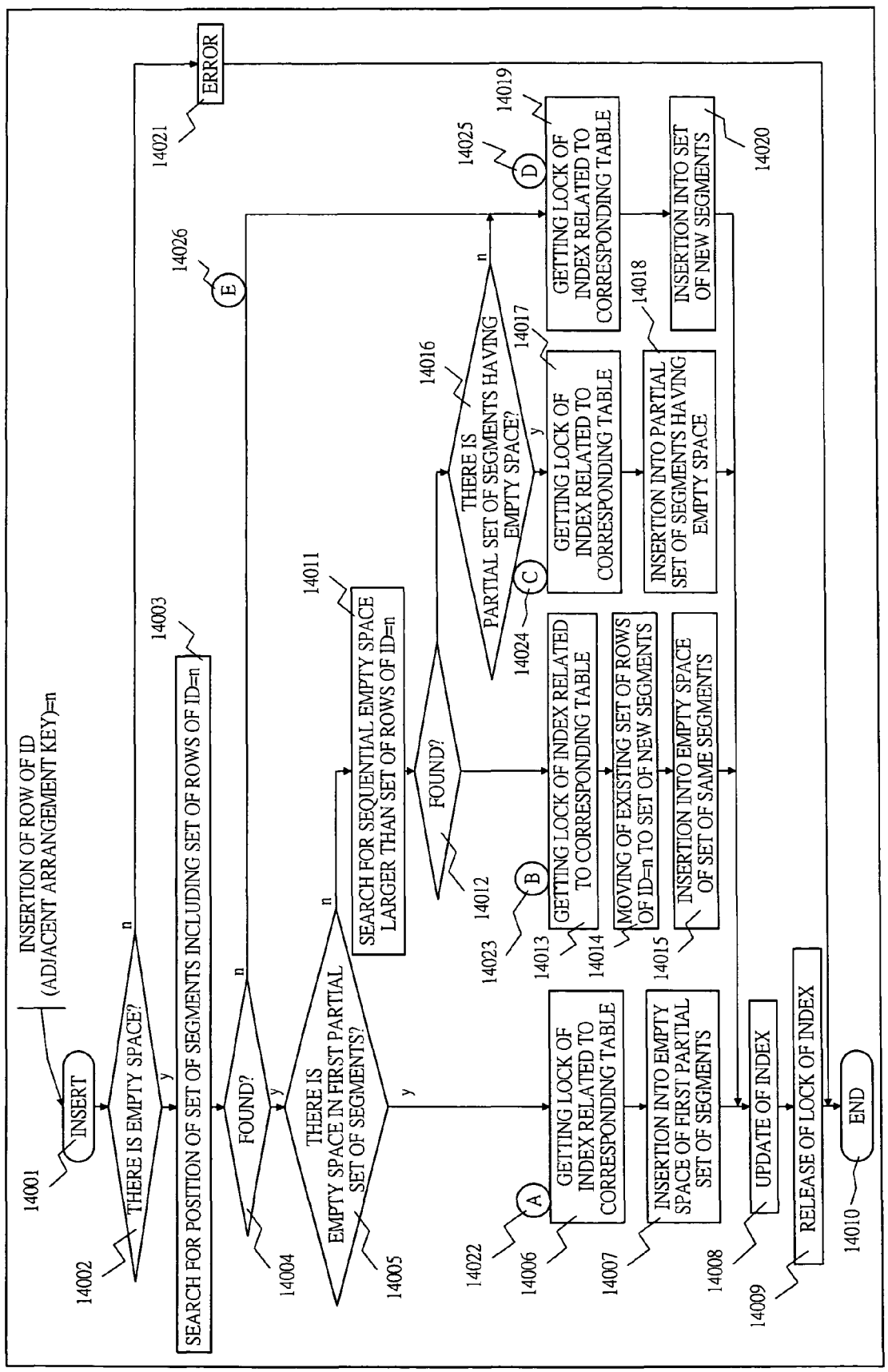
FIG. 13 is an explanatory diagram showing a flow chart of insert operation to the duplicated ID sequential arrangement table according to the first embodiment of the present invention.

It is noted that a plurality of segments structuring a set of rows (12002) having the same ID arranged in adjacent segments is referred to herein below as a set of rows (13001) of the same ID composed of a set of segments shown in FIG. 12. In addition, used space (12005) and empty space (12006) are referred to shortly as used space (13002) and empty space (13003), respectively.

In a case of performing an insert operation to the duplicated ID sequential arrangement table, since it is required to maintain a state in which rows having the same ID are arranged in adjacent segments physically, the insertion is performed by a method different from that used for a normal table. The method of performing the insert operation to the duplicated ID sequential arrangement table is explained with reference to a flow chart shown in FIG. 13.

In an insert processing (14001) performing the insert operation, first, size of a row to be inserted and size of empty space of the storage space are compared, and a judgment (14002) of whether the insertion can be performed is made. Here, if the insertion cannot be performed, an error judgment is made (14021), and the insert processing ends (14010). If the insertion can be performed, a search (14003) is performed for a position of a set of segments including a set of rows having the same ID in the storage space. Different from the case of the clustered table described above, this search (14003) is based on an equality condition, and there may be a case in which the set of segments cannot be found. Therefore, a judgment (14004) of whether the set of segments is found is carried out.

Figure 14:
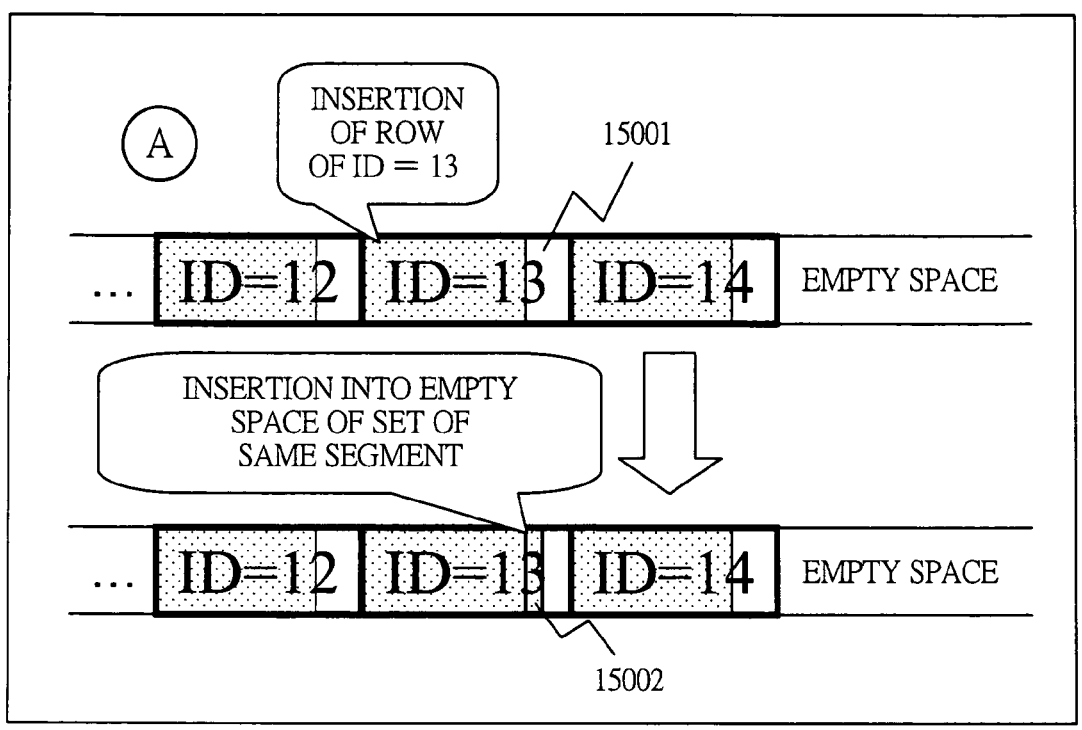
FIG. 14 is an explanatory diagram showing an example of a procedure A in the flow chart of the insert operation to the duplicated ID sequential arrangement table according to the first embodiment of the present invention.

If the set of segments is found, a judgment (14005) of whether there is empty space to insert a row in a first partial set of the set of segments is carried out. If there is empty space, procedure A (14022) is carried out. In procedure A (14022), first, a lock of the index related to a corresponding table is obtained (14006), and then, the row is inserted into the empty space of the first partial set of the set of segments (14007), the index is updated (14008), the lock of the index is released (14009) and the insert processing ends (14010). An operation example in a case where a row of ID=13 is inserted according to procedure A (14022) is shown in FIG. 14. Here, since there is empty space in a set of segments (15001) including a set of rows of ID=13, the row is inserted into the empty space in a set of same segments (15002).

Figure 15:
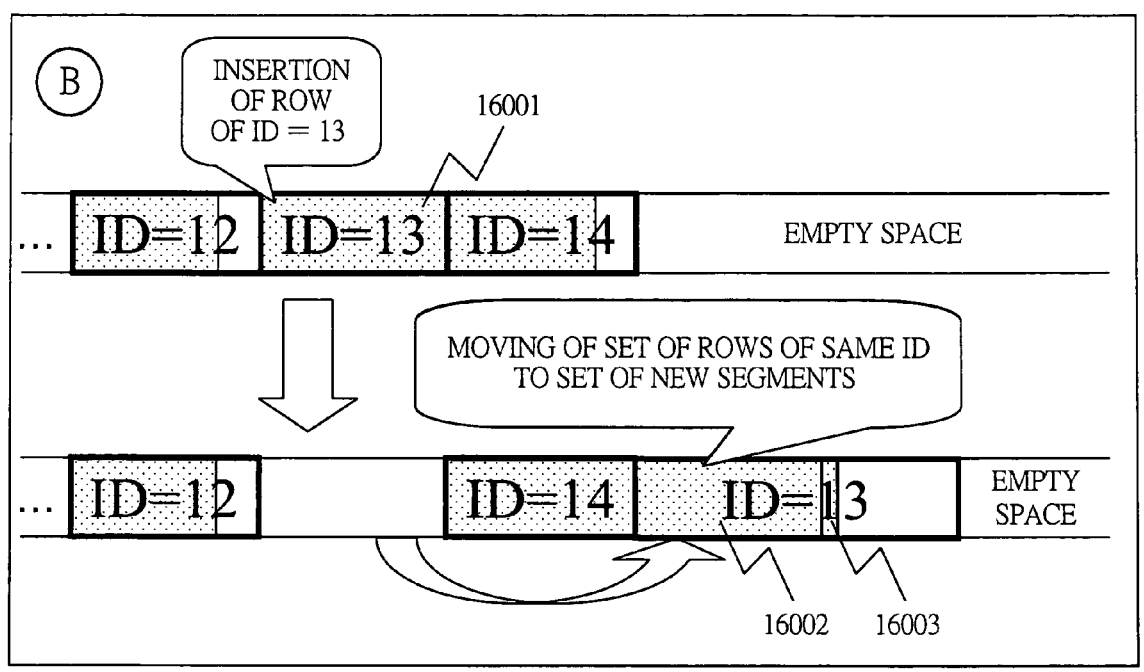
FIG. 15 is an explanatory diagram showing an example of a procedure B in the flow chart of the insert operation to the duplicated ID sequential arrangement table according to the first embodiment of the present invention.

On the other hand, if there is no empty space according to the judgment (14005), a sequential empty space larger than size of an entire set of rows having the same ID as that of the row to be inserted is searched for in the storage space (14011), and a judgment (14012) of whether it is found is made. In a case such a sequential empty space is found according to the judgment (14012), a procedure B (14023) is carried out. In procedure B (14023), first, a lock related to a corresponding table is obtained (14013), then an entire existing set of rows having the same ID as that of the row to be inserted is moved (14014) to a set of new segments to be secured in the empty space found in the search (14011), the row is inserted into empty space of a set of the same segments (14015), the index is updated (14008), the lock of the index is released (14009), and the insert processing ends (14010). An operation example in a case where a row of ID=13 is inserted according to procedure B (14023) is shown in FIG. 15. Here, since there is no empty space in a set of segments including a set of rows of ID=13 (16001), an existing set of rows of ID=13 is moved (16002) to a set of new segments, and the row is inserted (16003) into empty space of a set of the same segments.

Figure 16:
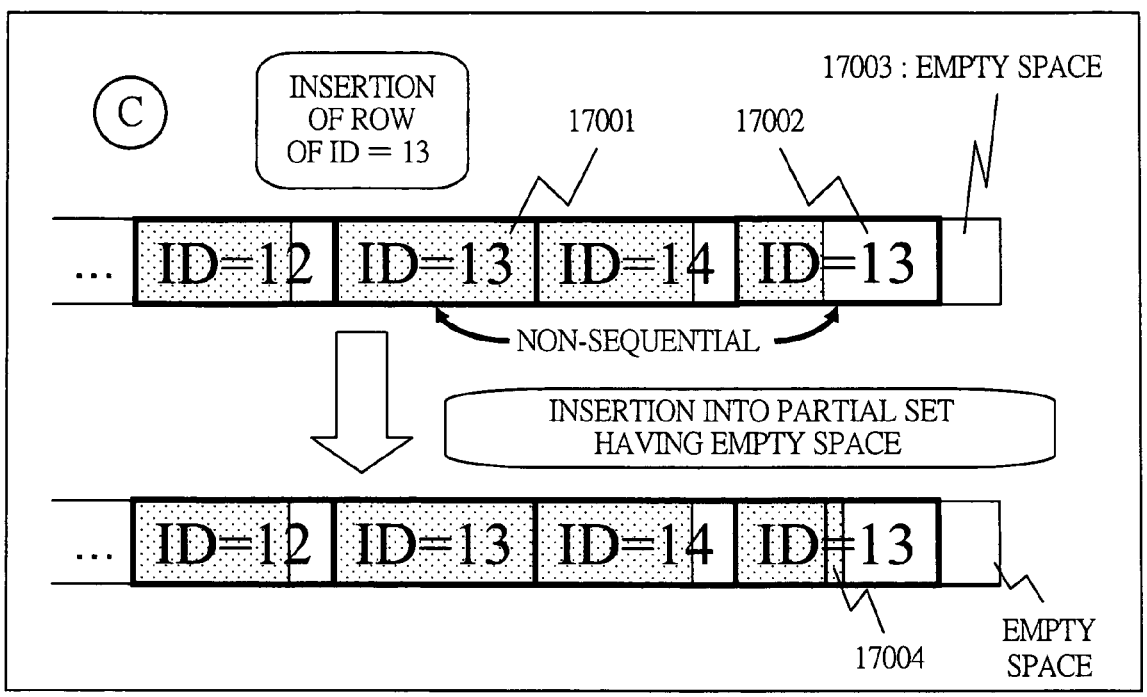
FIG. 16 is an explanatory diagram showing an example of a procedure C in the flow chart of the insert operation to the duplicated ID sequential arrangement table according to the first embodiment of the present invention.

In a case where a sequential empty space larger than the size of the entire set of rows having the same ID as that of the row to be inserted is not found in the judgment (14012), a judgment (14016) of whether there is a partial set having empty space in partial sets of the set of segments having the same ID as that of the row to be inserted is made. If such a partial set of the set of segments having empty space is found according to the judgment (14016), a procedure C (14024) is carried out. In procedure C (14024), first, a lock related to a corresponding table is obtained (14013), the row is inserted into the partial set of the set of segments having the empty space (14018), the index is updated (14008), the lock of the index is released (14009), and the insert processing ends (14010). An operation example in a case where a row of ID=13 is inserted according to procedure C (14024) is shown in FIG. 16. Here, since a set of segments including a set of rows of ID=13 is composed of two partial sets (17001, 17002), and further, empty space (17003) is smaller than a size of an entire set of rows of ID=13, the row is inserted (17004) into a second partial set (17002).

Figure 17:
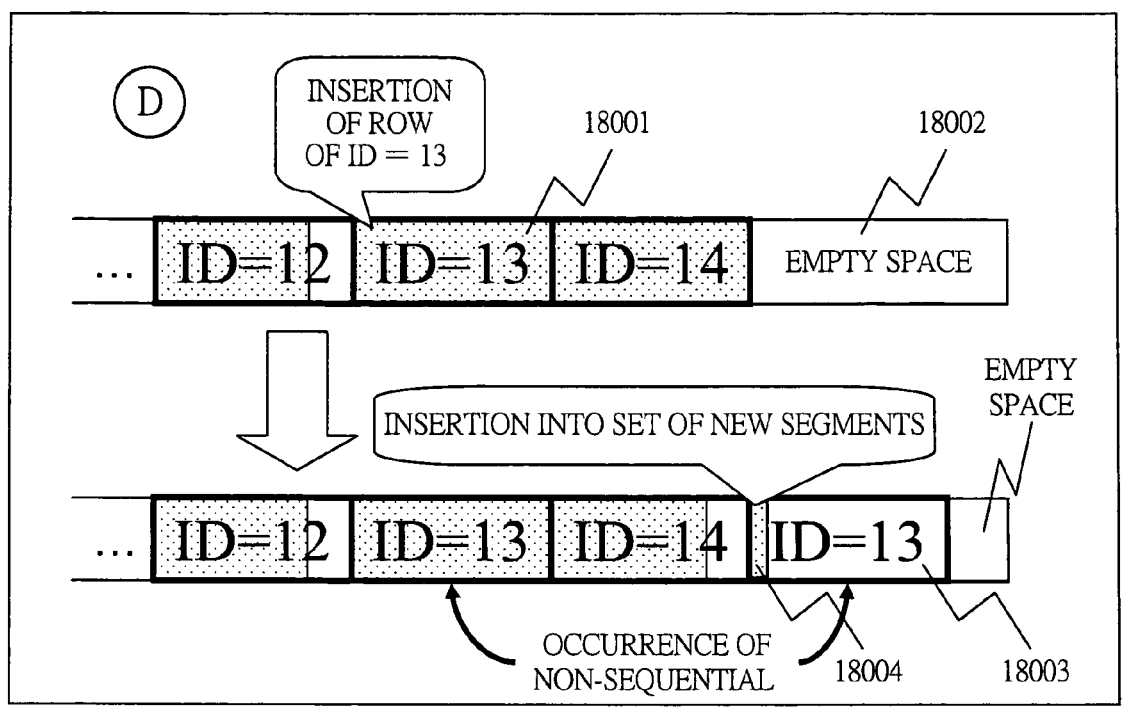
FIG. 17 is an explanatory diagram showing an example of a procedure D in the flow chart of the insert operation to the duplicated ID sequential arrangement table according to the first embodiment of the present invention.

On the other hand, in a case where a partial set of segments having empty space is not found according to the judgment (14016), a procedure D (14025) is carried out. In procedure D (14025), first, a lock related to a corresponding table is obtained (14019), and then, the row is inserted into a new partial set of the set of segments (14020), the index is updated (14008), the lock of the index is released (14009), and the insert processing ends (14010). An operation example in a case where a row of ID=13 is inserted according to procedure D (14025) is shown in FIG. 17. Here, since there is no empty space in a set of segments (18001) including a set of rows of ID=13, and further, since empty space (18002) is not large enough, a new partial set (18003) is secured in the empty space (18002), and the row of ID=13 is inserted (18004).

Figure 18:
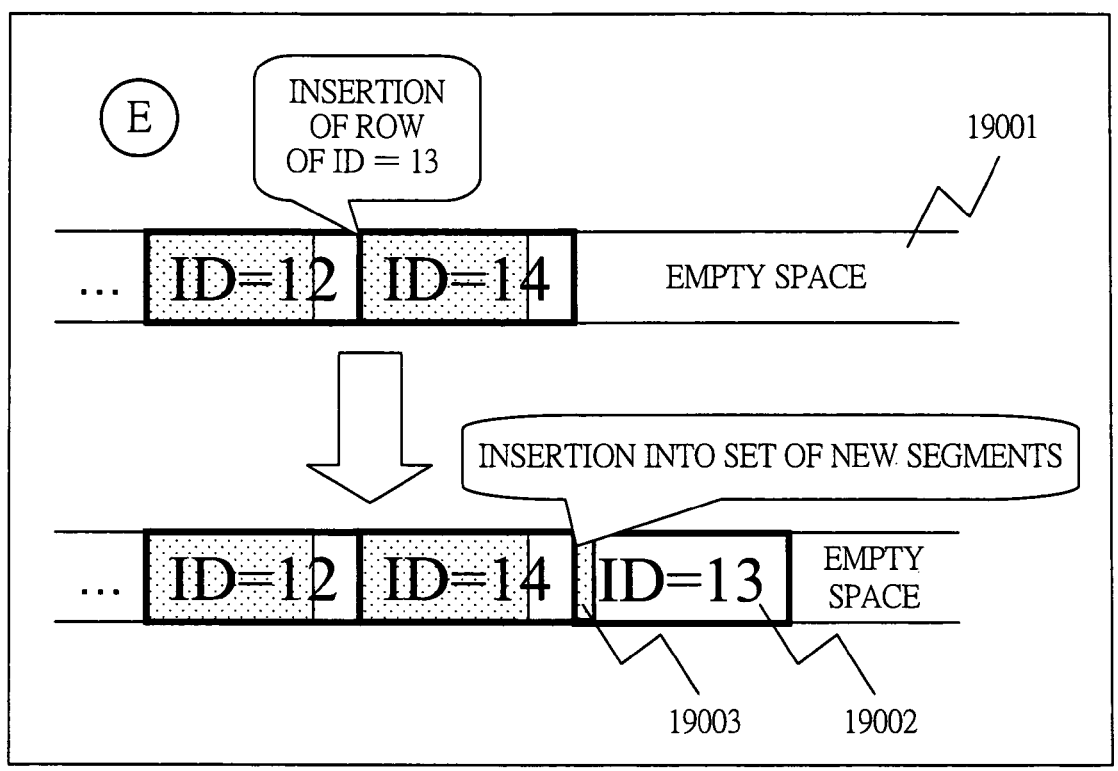
FIG. 18 is an explanatory diagram showing an example of a procedure E in the flow chart of the insert operation to the duplicated ID sequential arrangement table according to the first embodiment of the present invention.

Further, in a case where a set of segments including a set of rows having the same ID as that of the row to be inserted is not found according to the judgment (14004), procedure E (14026) is carried out. In procedure E (14026), first, a lock related to a corresponding table is obtained (14019), and then, the row is inserted (14020) into a new partial set of the set of segments, the index is updated (14008), the lock of the index is released (14009), and the insert processing ends (14010). An operation example in a case where a row of ID=13 is inserted according to procedure E (14025) is shown in FIG. 18. Here, since there is not a set of segments including a set of rows of ID=13, a new partial set (19002) is secured in the empty space (19001), and the row of ID=13 is inserted (19003).

In the present embodiment, by performing procedure C (14024), the rows having duplicate IDs are stored in non-sequential space. However, by performing procedure B (14023) in subsequent insert operations, the rows are rearranged to sequential space.

Second Embodiment

Figure 19:
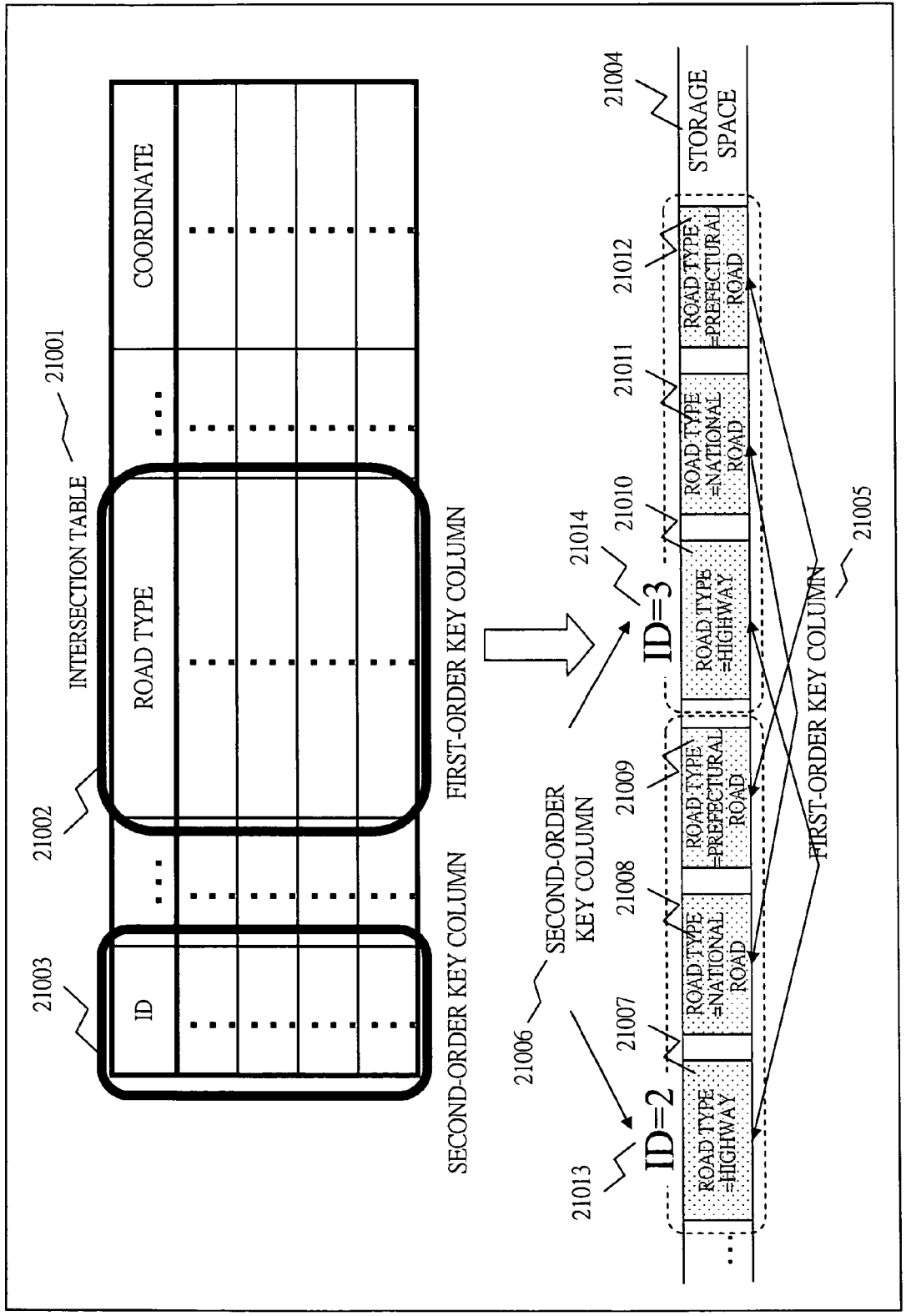
FIG. 19 is an explanatory diagram showing an example of a structure of a table including first-order and second-order duplicated keys according to a second embodiment of the present invention and a structure thereof on storage space.

By arranging a plurality of columns of the columns structuring a table within a physical vicinity on storage, the speed of I/O to a storage device may increase. FIG. 19 shows an example in which, among columns structuring an intersection table (21001), an ID column (21003) and a road type column (21002) are arranged (21005, 21006) within a physical vicinity on storage space (21004).

In the present embodiment, a plurality of columns designated to be arranged within a physical vicinity are sequentially called n-th-order key columns, and in the more dominant column, a value of n is set larger. In this example, in a case of an equality condition search of the ID column (21003), which is a second-order key column, all data can be fetched collectively. For example, as for an equality condition search having "ID is equal to 2" as a search condition, a set of segments (21013) of ID=2 can be fetched collectively, and as for an equality condition search having "ID is equal to 3" as a search condition, a set of segments (21014) with ID=3 can be fetched collectively.

Further, in a case of an equality condition search of a road type column (21002), which is a first-order key column, since rows matching the condition are organized, data can be fetched at high speed. For example, as for an equality condition search having "road type is equal to highway" as a search condition, a plurality of sets of segments (21007, 21010) of road type=highway are fetched, in a case of "road type is equal to national road", a plurality of sets of segments (21008, 21011) of road type=national road are fetched, and in a case of "road type is equal to prefectural road", a plurality of sets of segments (21009, 21012) of road type=prefectural road are fetched. Such a table is one obtained by expanding a duplicated ID sequential arrangement table so as to cope with a plurality of columns.

In a case where an insert operation is performed to the duplicated ID sequential arrangement table expanded to a plurality of columns, it is required to maintain a state in which rows having the same ID are arranged in adjacent segments physically over a plurality of columns, and therefore, insertion is performed by a method different from that used for a normal table.

Figure 20:
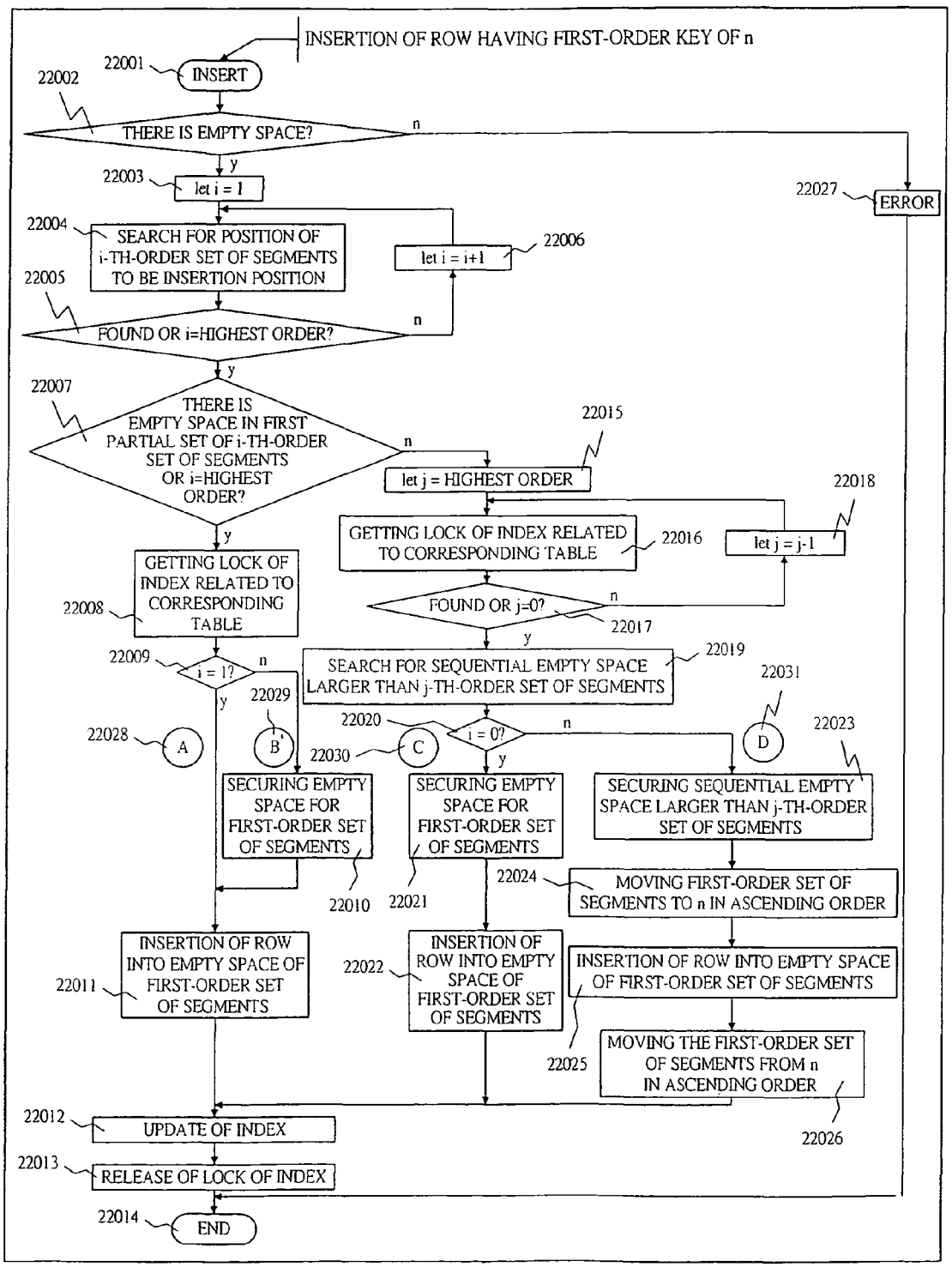
FIG. 20 is an explanatory diagram showing a flow chart of insert operation to a duplicated ID sequential arrangement table according to the second embodiment of the present invention.

A method of performing insert operation to the duplicated ID sequential arrangement table expanded to a plurality of columns is described with reference to a flow chart shown in FIG. 20.

In an insert processing (22001) for performing the insert operation, first, a size of a row to be inserted and a size of empty space of storage space are compared, and a judgment (22002) of whether the insertion can be performed is made. Here, if the insertion cannot be performed, an error judgment is made (22027), and the insert processing ends (22014). If the insertion can be performed, an insert portion is searched for in the storage space. For example, in an example shown in FIG. 19, the insert portion of a row of ID=2 and road type=national road is one segment (21008) included in a set of segments of ID=2 among a plurality of sets of segments (21008, 21011) of road type=national road. Here, using a counter variable i, a position of an i-th-order set of segments to be the insert portion is searched for (22004) sequentially from i=1 (22003). And then, a judgment (22005) of whether such a position found is made, and if it is not found, 1 is added to i (22006), and the search (22004) is repeated.

Figure 21:
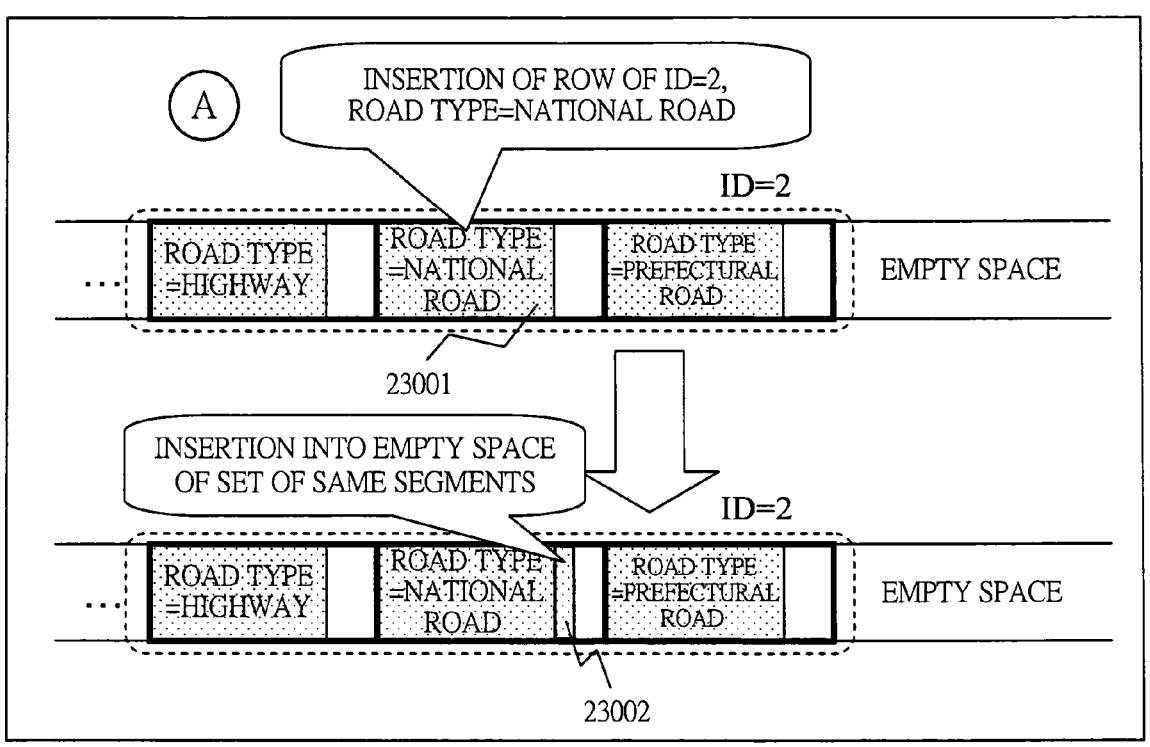
FIG. 21 is an explanatory diagram showing an example of a procedure A in the flow chart of the insert operation to the duplicated ID sequential arrangement table according to the second embodiment of the present invention.

In a case where i reaches a highest order, the procedure proceeds ahead to a judgment (22007) of whether there is empty space in a first partial set of an i-th-order set of segments found in the judgment (22005) or whether i is a highest order, and if either of these conditions is satisfied, a lock of an index related to a corresponding table is obtained (22008), and then, a judgment (22009) of whether i=1 is true is made. If i=1 is true in the judgment (22009), a procedure A (22028) is carried out. In procedure A (22028), first, the row is inserted into an empty space of a first-order set of segments (22011), the index is updated (22012), the lock of the index is released (22013), and the insert operation ends (22014). An operation example in a case where a row of ID=2 and road type=national road is inserted according to procedure A (22028) is shown in FIG. 21. Here, since there is empty space in a set of segments (23001) including a set of rows of ID=2 and road type=national road, the row is inserted (23002) into the empty space of a set of the same segments.

Figure 22:
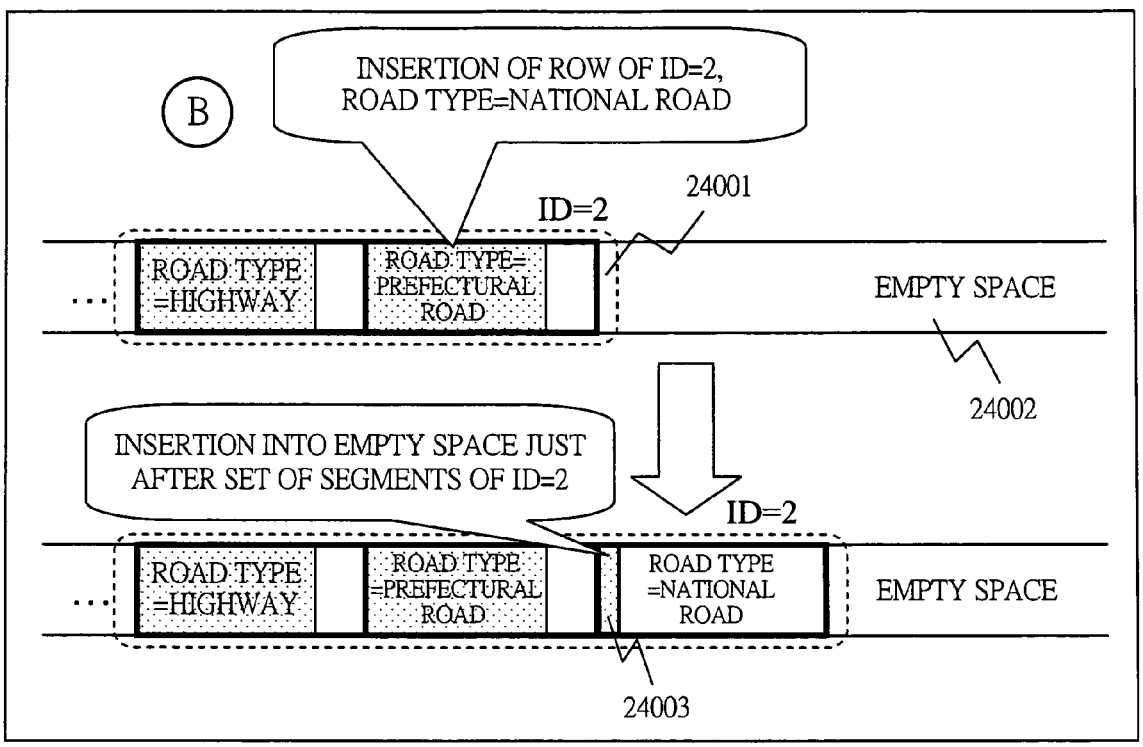
FIG. 22 is an explanatory diagram showing an example of a procedure B in the flow chart of the insert operation to the duplicated ID sequential arrangement table according to the second embodiment of the present invention.

On the other hand, in a case where i=1 is not true in the judgment (22009), a procedure B (22029) is carried out. In procedure B (22029), since a first-order set of segments to which the row is inserted was not found in the judgment (22004), first, empty space is secured (22010) for the first-order set of segments. And then, the row is inserted (22011) into the empty space of the first-order set of segments, the index is updated (22012), the lock of the index is released (22013), and the insert operation ends (22014). An operation example in a case where a row of ID=2 and road type=national road is inserted according to procedure B (22029) is shown in FIG. 22. Here, although there is no set of segments including a set of rows of ID=2 and road type=national road, there is sequential empty space (24002) just after a set of segments (24001) including a set of rows of ID=2, and therefore, space for the first-order set of segments is secured just after the set of segments (24001) including the set of rows of ID=2, and the row is inserted (24003) thereinto.

In a case where both the conditions are not satisfied in the judgment (22007), an action moving a second or higher order set of segments to other empty space is carried out. Here, using a counter variable j, a sequential empty space larger than a j-th-order set of segment is searched for (22016) sequentially from j=highest order (22015). And then, a judgment (22017) of whether such a sequential empty space is found is made, and if it is not found, 1 is subtracted from j (22018), and the search (22016) is repeated.

Here, in a case where j reaches 0, the procedure proceeds from the judgment (22017), and the lock of the index related to the corresponding table is obtained (22019).

Figure 23:
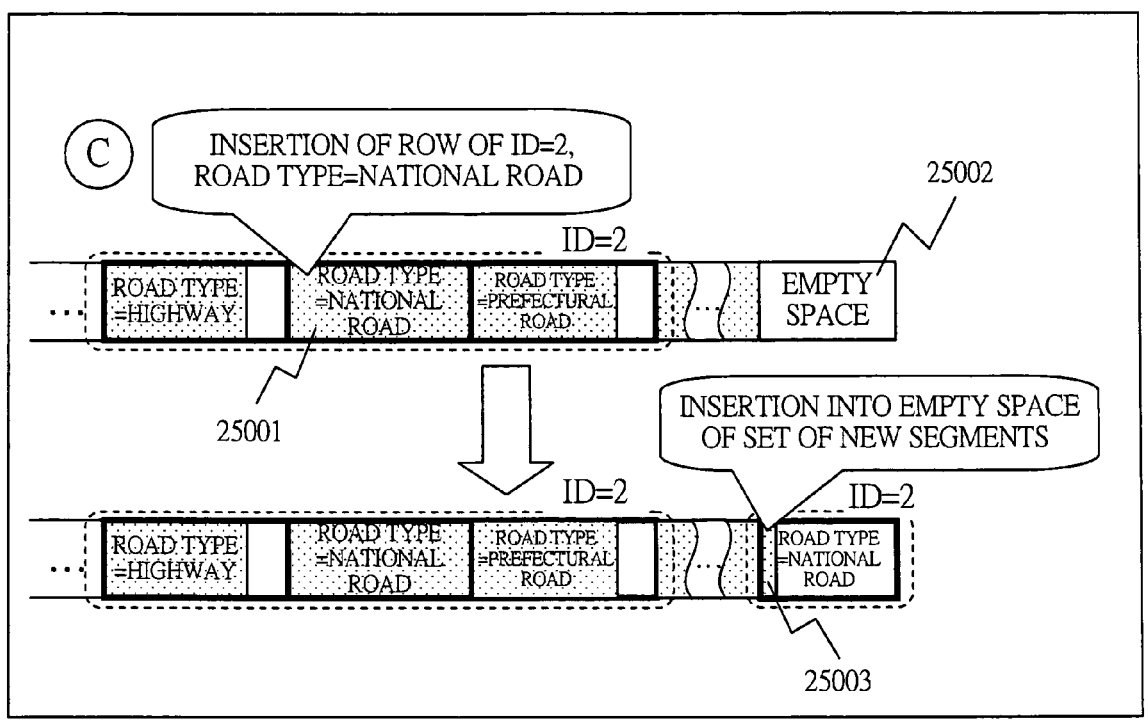
FIG. 23 is an explanatory diagram showing an example of a procedure C in the flow chart of the insert operation to the duplicated ID sequential arrangement table according to the second embodiment of the present invention.

Next, a judgment (22020) of whether j=0 is true is made. In a case where j=0 is true in the judgment (22020), a procedure C (22030) is carried out. In procedure C (22030), since j=0 is true in the judgment (22017), that is, a sequential empty space larger than the first-order set of segments cannot be secured, the first-order set of segments is divided. First, empty space for the first-order set of segments is secured (22021), the row is inserted (22022) into the empty space of the first-order set of segments, the index is updated (22012), the lock of the index is released (22013), and the insert operation ends (22014). An operation example in a case where a row of ID=2 and road type=national road is inserted according to procedure C (22030) is shown in FIG. 23. Here, since there is no empty space in the first-order set of segments (25001) including a set of rows of ID=2 and road type=national road and a size of empty space (25002) is smaller than the first-order set of segments (25001), empty space for the first-order set of segments is secured in the empty space (25002), and then, the row is inserted (25003) into the empty space of the first-order set of segments.

In a case where j=0 is not true in the judgment (22020), a procedure D (22031) is carried out. In procedure D (22031), since judgment that sequential empty space larger than a j-th-order set of segments higher than first-order is found in the judgment (22017) is made, the j-th-order set of segments is rearranged in a sequential space.

Figure 24:
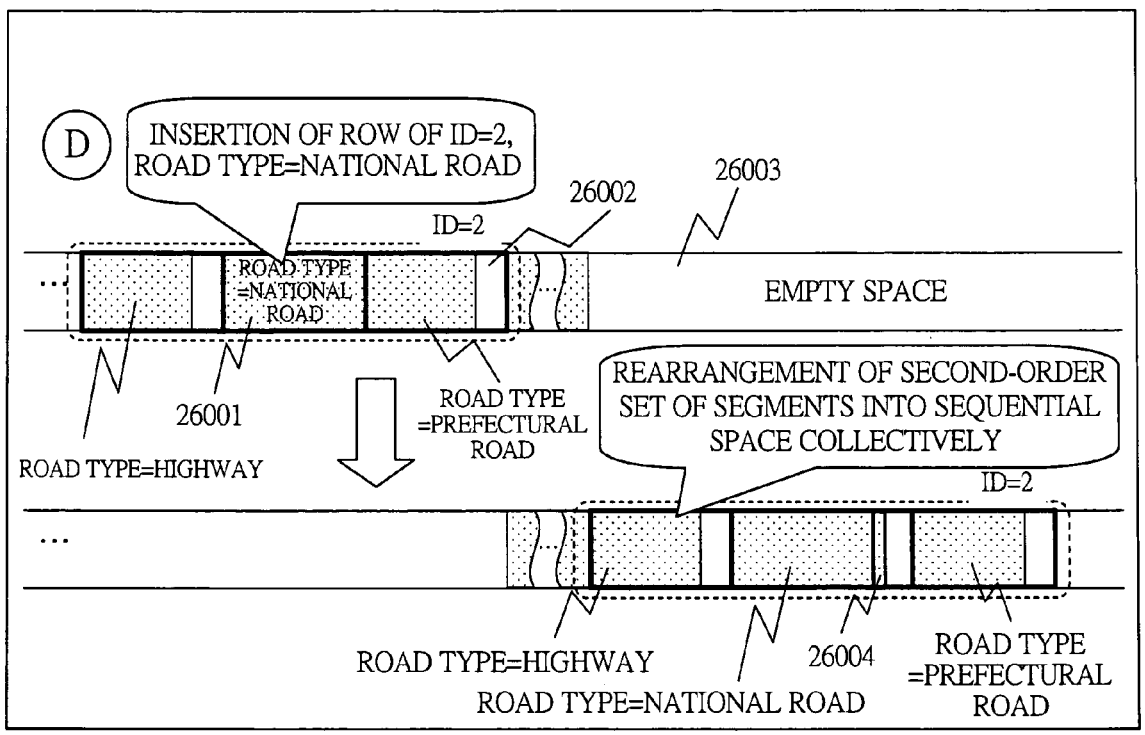
FIG. 24 is an explanatory diagram showing an example of a procedure D in the flow chart of the insert operation to the duplicated ID sequential arrangement table according to the second embodiment of the present invention.

First, sequential empty space larger than the j-th-order set of segments is secured (22023) in the empty space found in the search (22016), and then, the first-order set of segments is moved (22024) to n, which is an insertion row, in ascending order, the row is inserted (22025) into empty space of the first-order set of segments, the first-order set of segments is moved (22026) from n, which is the insertion row, or later in ascending order, the index is updated (22012), the lock of the index is released (22013), and the insert operation ends (22014). An operation example in a case where a row of ID=2 and road type=national road is inserted according to procedure D (22031) is shown in FIG. 24. Here, since there is no empty space in a first-order set of segments (26001) including a set of rows of ID=2 and road type=national road and size of empty space (26003) is larger than a second-order set of segments (26002), the second-order set of segments is rearranged (26004) collectively in sequential space.

Finally, a duplicated ID sequential arrangement table identification table, a duplicated ID sequential arrangement table ID management table, and a duplicated ID sequential arrangement table parent-child relation management table according to the present embodiment are shown in FIG. 25. The duplicated ID sequential arrangement table identification table (27001) is composed of a management number (27002) column and a table name (27003) column, and is the same as the duplicated ID sequential arrangement table identification table 1005 according to the first embodiment shown in FIG. 2. The duplicated ID sequential arrangement table ID management table (27004) is composed of a table name (27005) column and a column name (2700.6) column, and the duplicated ID sequential arrangement table parent-child relation management table is composed of a table name (27008) column, a column name (27009) column, and an order number (27010) column.

Here, since the intersection table (21001) is stored as the duplicated ID sequential arrangement table by designating the road type column (21002) in FIG. 19 as a first-order key column and the ID column (21003) as a second-order key column, a row (27011) indicating the intersection table is included in the duplicated ID sequential arrangement table identification table (27001), a row (27012) showing the road type column of the intersection table and a row (27013) indicating the ID column are included in the duplicated ID sequential arrangement table ID management table (27004), and, further, a row (27014) showing that an order number of the road type column is 1 and a row (27015) showing that an order number of the ID column is 2 are included in the duplicated ID sequential arrangement table parent-child relation management table (27007).

Third Embodiment

A Z-order storage method is an effective storage method of map data divided into sections (10001) as shown in FIG. 9. An example of the Z-order storage method is shown in FIG. 26. The Z-order storage method is a method allocating identification numbers of sections in a Z-shaped order, and storing data in order of the section numbers.

As an example of an allocation method of the identification numbers, in FIG. 26, identification numbers from 1 to 4 are allocated in Z-shaped (28005) order to a set of adjacent four sections (28001, 28002, 28003, 28004) at left top. By using the Z-order storage method, in a case where an intersection list fetch is performed for the nine sections around the car marked as A (28006), intersection data of adjacent four sections marked as 'a' (28007) can be fetched collectively.

The Z-order storage method can be expanded to the space of four or more adjacent sections. An example of second-order Z-order storage handling the adjacent 16 sections is shown in FIG. 27. A set of the adjacent 16 sections is structured by allocating four sets of adjacent four sections in Z-shaped order. In FIG. 27, identification numbers are allocated to the four sets of adjacent four sections (29001, 29002, 29003, 29004) in Z-shaped order (29005). Here, sets of adjacent four sections (29001, 29002, 29003, 29004) are referred to as a first-order Z-shape, and the set of adjacent 16 sections (29005) is referred to as a second-order Z-shape.

By allocating identification numbers in second-order Z-shaped order, sections from 1 (29006) to 16 (29007) can be stored so as to be fetched collectively. And, by enlarging the Z-shape in the same manner, expansion such as to obtain a third-order Z-shape composed of 64 adjacent sections or a fourth-order Z-shape composed of 256 adjacent sections can be made.

The four sections included in the same first-order Z-shape have a characteristic that values obtained by dividing (section number-1) by four are equal. The value obtained by adding 1 to this quotient is defined as a first-order Z-shape identifier. The first-order Z-shape identifiers (28008, 28009, 28010, 28011, 28012, 28013, 28014, 28015, 28016, 28017, 28018, 28019, 29020, 28021, 28022, 28023) are identifiers allocated according to the above definition.

In the same manner, as for the second-order Z-shape, a value obtained by adding 1 to a quotient obtained by dividing (first-order Z-shape identifier-1) by four is referred to as a second-order Z-shape identifier. The numerals 1, 2, 3, and 4 indicated by reference symbols 29008 to 29011 in FIG. 27 are the second-order Z-shape identifiers allocated sequentially according to the above definition.

The Z-order storage method handled in the present embodiment can be embodied as a special example of the duplicated ID sequential arrangement table expanded to a plurality of columns shown in the second embodiment irrespective of a storage order.

FIG. 28 shows an example in which a first-order Z-order storage method is expanded to a plurality of columns. Here, an example in which among columns structuring the intersection table (30001), four sections adjacent in first-order Z-shaped order with regard to an ID column (30002) are arranged (30014, 30015) within a physical vicinity on storage space (30003) is shown. Here, among the four adjacent four sections in first-order Z-shaped order shown in FIG. 26, a fourth adjacent four sections (28011) and a fifth adjacent four sections (28012) are arranged. The fourth adjacent four sections (28011) are a set of segments (30014) of first-order Z-shaped order identifier=4, and four sections (30006, 30007, 30008, 30009) structuring this are arranged in sequential space as a first-order key column (30004) on the storage space.

And, the fifth adjacent four sections (28012) are a set of segments (30015) of first-order Z-shaped order identifier=5, and four sections (30010, 30011, 30012, 30013) structuring this are arranged in sequential space as a first-order key column (30004) on the storage space (30003) in the same manner. As described above, by regarding the first-order Z-shape identifiers as the second-order key columns, it can be embodied as a special example of the duplicated ID sequential arrangement table expanded to two columns. Recursively, by regarding n-th Z-shape identifiers as n+1-th key columns, it can be embodied as a special example of a duplicated ID sequential arrangement table expanded to n+1 columns.

A duplicated ID sequential arrangement identification table, a duplicated ID sequential arrangement ID management table and a duplicated ID sequential arrangement table parent-child relation management table used in the present embodiment are described with reference to FIG. 29. In the present embodiment, in comparison with the case in the second embodiment, information to be managed in the duplicated ID sequential arrangement table parent-child relation management table is different.

In the duplicated ID sequential arrangement table parent-child relation management table (31007) used in the present embodiment, in addition to a table name (31008) column, a column name (31009) column and an order number (31011) column, a condition column (31010) column is provided so that it can be identified whether it follows to the Z-order storage method. The duplicated ID sequential arrangement table identification table (31001) is composed of a management number (31002) column and a table name (31003) column in the same manner as in the second embodiment, and the duplicated ID sequential arrangement table ID management table (31004) is structured of a table name (31005) column and a column name (31006) column in the same manner as in the second embodiment.

Here, in order to arrange four vicinities adjacent in the first-order Z-shaped order adjacently with respect to the ID column (30002) of the intersection table (30001) in FIG. 28, a row (31012) indicating the intersection table is included in the duplicated ID sequential arrangement table identification table (31001), a row (31013) indicating the ID column of the intersection table is included in the duplicated ID sequential arrangement table ID management table (31004) and a row (31014) showing that an order number of the ID column is 1 and the Z-order storage method is applied and a row (31015) showing that an order number of the ID column is 2 and the Z-order storage method is applied in the same manner are included in the duplicated ID sequential arrangement table parent-child relation management table (31007).

Note that, in the present embodiment, the Z-order storage method is taken as an example, however, an N-order storage method arranging N-shaped order four vicinities in the same manner and a clock-order storage method arranging four vicinities clockwise can known easily by analogy. Also in the duplicated ID sequential arrangement table parent-child relation management table (31007) in the present embodiment, by designating the N-order storage method or the clock-order storage method in the condition column (31010), the N-order storage method or the clock-order storage method can be realized.

INDUSTRIAL APPLICABILITY

In embedded applications, since restriction of usable memory size is severe and a large buffer cannot be allocated like in DBMS for server, I/O performance of a storage device affects directly upon total search performance. Especially in car navigation system application, since a file structure optimized so that a conventional car navigation system can use sequential access of an optical disk device efficiently is used, even if a hard disk device of higher-speed is introduced, by occurrence of a random access, performance is degraded with respect to an optical disk. Therefore, it is necessary to perform a control so as to restrict such random access when using embodiments of the present invention.

The invention claimed is:

1. A database management method for updating data of a duplicated ID sequential arrangement table that is stored on a storage device and arranging segments of the data of the duplicated ID sequential arrangement table on the storage device, the database management method comprising:

managing a duplicated ID sequential arrangement table ID management table that holds a duplicated ID sequential arrangement table name and a name of a duplicated key column, the respective segments of the data of the duplicated ID sequential arrangement table for each set of rows that have identical values in the duplicated key column being arranged adjacently in storage space on the storage device;

upon receiving a request to insert a new row in the duplicated ID sequential arrangement table, if an empty space exists in the segments of the data on the storage device for a first partial set of rows having identical values in the duplicated key column to that of the new row, arranging the new row in the empty space in the segments of the data on the storage device for the first partial set of rows by referring to the duplicated ID sequential arrangement table ID management table;

if no empty space exists in the storage space that is sufficient for storing the new row adjacently to the segments of the data on the storage device for the first partial set of rows, searching for a sequential empty space having greater than sufficient capacity for storing the segments of the data on the storage device for a full set of rows having identical values in the duplicated key column to that of the new row;

moving the segments of the data on the storage device for the full set of rows with identical values in the duplicated key column to that of the new row to the sequential empty space if the sequential empty space is found; and arranging the new row in either an empty space in segments of the data on the storage device for a second partial set of rows that is different from the first partial set of rows or a new segment if the sequential empty space is not found.

* * * * *